(12) United States Patent
Hori et al.

(10) Patent No.: US 7,721,346 B2
(45) Date of Patent: May 18, 2010

(54) METHOD AND APPARATUS FOR ENCRYPTING DATA TO BE SECURED AND INPUTTING/OUTPUTTING THE SAME

(75) Inventors: Yoshihiro Hori, Moriguchi (JP); Yuichi Kanai, Moriguchi (JP); Ryoji Ohno, Matsudo (JP); Takeo Ohishi, Yokohama (JP); Kenichiro Tada, Tokorozawa (JP); Tatsuya Hirai, Yokohama (JP); Masafumi Tsuru, Chiyoda-ku (JP); Takayuki Hasebe, Kawasaki (JP)

(73) Assignees: Sanyo Electric Co., Ltd, Osaka (JP); Pioneer Corporation, Tokyo (JP); Fujitsu Limited, Kanagawa (JP); Sharp Corporation, Osaka (JP); Hitachi Global Storage Technologies Japan, Ltd., Kanagawa-Ken (JP); Victor Company of Japan Limited, Yokohama (JP); Phoenix Technologies K.K. of Tokyo, Tokyo (JP)

( * ) Notice: Subject to any disclaimer, the term of this patent is extended or adjusted under 35 U.S.C. 154(b) by 1077 days.

(21) Appl. No.: 10/809,815

(22) Filed: Mar. 26, 2004

(65) Prior Publication Data
US 2004/0250092 A1 Dec. 9, 2004

(30) Foreign Application Priority Data
Mar. 28, 2003 (JP) ............................ 2003-092946

(51) Int. Cl.
*G06F 11/30* (2006.01)
*G06F 12/14* (2006.01)
*G06F 21/00* (2006.01)

(52) U.S. Cl. ............................ 726/30; 705/59; 713/193
(58) Field of Classification Search ......... 713/189–190, 713/160, 193; 726/30; 705/59
See application file for complete search history.

(56) References Cited

U.S. PATENT DOCUMENTS 4,227,253 A * 10/1980 Ehrsam et al. ................ 380/45

(Continued)

FOREIGN PATENT DOCUMENTS

JP 01-292518 11/1989

(Continued)

OTHER PUBLICATIONS

Chinese Office Action for corresponding Application CN 200410031484.2, issued Sep. 2, 2005.

(Continued)

*Primary Examiner*—Christian LaForgia
(74) *Attorney, Agent, or Firm*—McDermott Will & Emery LLP

(57) ABSTRACT

A technology is provided to improve tamper resistance in encrypting data to be secured and inputting/outputting the data between a recording device and a host device. When the recording device issues an input/output command to a storage device to input/output data to be secured, the recording device attaches an ID to the command to identify to which cryptographic input/output processing the command belongs. Upon reception of a sequence command, the storage device receives the command if its ID has been allocated and the command is verified to have been issued in the correct sequence. The sequence ID is used to identify a process system while appropriately managing the steps of executing commands.

15 Claims, 22 Drawing Sheets

U.S. PATENT DOCUMENTS

| | | | | |
|---|---|---|---|---|
| 4,238,853 | A * | 12/1980 | Ehrsam et al. | 380/45 |
| 4,238,854 | A * | 12/1980 | Ehrsam et al. | 713/165 |
| 4,278,837 | A * | 7/1981 | Best | 713/190 |
| 4,386,234 | A * | 5/1983 | Ehrsam et al. | 380/281 |
| 4,465,901 | A * | 8/1984 | Best | 713/190 |
| 5,058,164 | A * | 10/1991 | Elmer et al. | 713/190 |
| 5,781,775 | A * | 7/1998 | Ueno | 718/102 |
| 5,809,148 | A * | 9/1998 | Doberstein et al. | 713/161 |
| 5,991,774 | A * | 11/1999 | Tate et al. | 707/203 |
| 6,226,749 | B1 * | 5/2001 | Carloganu et al. | 726/2 |
| 6,275,909 | B1 * | 8/2001 | Arimilli et al. | 711/146 |
| 6,295,604 | B1 * | 9/2001 | Callum | 713/160 |
| 6,297,610 | B1 * | 10/2001 | Bauer et al. | 318/562 |
| 7,099,479 | B1 * | 8/2006 | Ishibashi et al. | 380/281 |
| 7,158,637 | B2 * | 1/2007 | Ohta et al. | 380/37 |
| 7,269,738 | B1 * | 9/2007 | Kivimaki | 713/189 |
| 2002/0048364 | A1 * | 4/2002 | Gligor et al. | 380/37 |
| 2003/0046563 | A1 * | 3/2003 | Ma et al. | 713/190 |
| 2003/0221114 | A1 * | 11/2003 | Hino et al. | 713/189 |
| 2003/0226029 | A1 * | 12/2003 | Porter et al. | 713/200 |
| 2004/0249993 | A1 * | 12/2004 | Hori et al. | 710/20 |
| 2006/0018473 | A1 * | 1/2006 | Hori | 380/255 |
| 2006/0018474 | A1 * | 1/2006 | Hori et al. | 380/255 |
| 2006/0021063 | A1 * | 1/2006 | Hori | 726/27 |
| 2006/0069650 | A1 * | 3/2006 | Hori | 705/57 |
| 2006/0106721 | A1 * | 5/2006 | Hori et al. | 705/51 |

FOREIGN PATENT DOCUMENTS

| | | |
|---|---|---|
| JP | 05-165728 | 7/1993 |
| JP | 05-181676 | 7/1993 |
| JP | 09-160838 | 6/1997 |
| JP | 09-258907 | 10/1997 |
| JP | 11-045507 | 2/1999 |
| JP | 11-149414 | 6/1999 |
| JP | 11-282991 | 10/1999 |
| JP | 11-312056 | 11/1999 |
| JP | 2000-173158 A | 6/2000 |
| JP | 2001-051845 | 2/2001 |
| JP | 2001-222380 | 8/2001 |
| JP | 2002-204229 | 7/2002 |
| JP | 2002-268550 | 9/2002 |
| JP | 2002-351747 | 12/2002 |
| JP | 2003-510686 | 3/2003 |
| WO | WO 03/005158 A2 | 1/2003 |
| WO | WO 03/005245 A2 | 1/2003 |
| WO | WO 03/005247 A2 | 1/2003 |
| WO | WO 03/005625 A2 | 1/2003 |

OTHER PUBLICATIONS

Japanese Notification of Reason(s) for Refusal, w/ English translation thereof, issued in Japanese Patent Application No. JP 2003-092946 dated Mar. 24, 2009.

Japanese Office Action, with English Translation, issued in Japanese Patent Application No. JP 2003-092946. dated Sep. 1, 2009.

* cited by examiner

METHOD AND APPARATUS FOR ENCRYPTING DATA TO BE SECURED AND INPUTTING/OUTPUTTING THE SAME

BACKGROUND OF THE INVENTION

1. Field of the Invention

The present invention relates to a data input/output technology, and more particularly, to a technology for encrypting data to be secured and inputting/outputting the same between a storage device and a host device.

2. Description of the Related Art

With recent dramatic advances in size reduction, finer design rules, and larger-scale production of storage cells, storage media are being reduced in size and price, and increased in capacity. In these circumstances, the inventors have made attempts to implement a further improved recording medium of yet higher convenience, and to improve the use of a large-capacity hard disk which was conventionally used by fixedly connecting to a single host device. These attempts lead to a hard disk being configured to be detachable from the host device and thereby serve as a removable medium which allows the data to be shared among a plurality of host devices. The size-reduced, large-capacity hard disk that is accessible at relatively high speeds can be used as a removable medium with considerable merit.

For example, see Japanese Patent Laid-Open Publication No. 2000-173158 (its entirety incorporated herein by reference).

In view of user convenience, any host devices are desirably adapted to read or write data on the removable hard disk. On the other hand, this also means that the data may be possibly leaked to a third party.

Now that attention is focused on the distribution of digital contents such as music and pictures, it is critical to develop such a technology that can properly protect data to be secured technology in order to protect copyrights and prevent digital contents from being leaked out.

SUMMARY OF THE INVENTION

The present invention has been achieved in view of the aforementioned circumstances. It is therefore an object of the present invention to provide a technology which offers improved tamper resistance in encrypting data to be secured for input and output between a storage device and a host device. It is another object of the invention to provide a technology which allows a cryptographic input/output processing to be performed between the storage device and the host device with a higher degree of efficiency.

An aspect of the present invention relates to a storage device. The storage device comprises a storage medium for retaining data, and a cryptographic processing unit which receives a plurality of commands from a host device to execute the commands upon performing a plurality of series of cryptographic input/output processing for encrypting data to be secured and inputting/outputting the data between the storage medium and a host device, the commands being issued by dividing the plurality of series of cryptographic input/output processing each into a plurality of procedures. The cryptographic processing unit can refer to identifying information attached to the command to identify to which cryptographic input/output processing the command belongs to, then simultaneously performing two or more of the plurality of cryptographic input/output processing procedures.

As will be discussed later, the cryptographic input/output processing is divided into a plurality of procedures to subdivide the command, thereby allowing the bus to be efficiently deallocated and a plurality of processes to be simultaneously performed. At this time, since commands that belong to a plurality of processes are simultaneously issued, identifying information is attached to each command for their proper identification.

The cryptographic processing unit may manage the sequence of commands executed in each cryptographic input/output processing and may also reject the execution of an incorrectly sequenced command when the cryptographic processing unit receives it. Alternatively, when the cryptographic processing unit receives an incorrectly sequenced command, the cryptographic processing unit may also interrupt the cryptographic input/output processing to which the command belongs. Interchanging the procedures of executing commands in the cryptographic input/output processing would possibly cause a security hole; however, the sequence of commands can be properly managed to prevent unauthorized access.

The number of the cryptographic input/output processings which can be performed simultaneously by the storage device may be predetermined in accordance with the performance of the storage device. Alternatively, in response to a request from the host device, the storage device may provide to the host device the maximum number of cryptographic input/output processings which can be performed simultaneously by the storage device. This allows for preparing an appropriate number of process systems responsive to the performance of the storage device. The storage medium may include a normal data storing unit which retains normal data and a secret data storage unit which retains data to be secured. The secret data storage unit may be adapted to be accessible only via the cryptographic processing unit. This makes it possible to minimize the risk of leakage of the data to be secured.

Another aspect of the present invention also relates to a storage device. The storage device comprises a storage medium for retaining data, and a cryptographic processing unit for receiving a plurality of commands from a host device to execute the commands upon performing a series of cryptographic input/output processing for encrypting data to be secured and inputting/outputting the data between the storage medium and the host device, the commands being issued by dividing the series of cryptographic input/output processing into a plurality of procedures. The cryptographic processing unit can manage two or more cryptographic input/output processings, and refer to identifying information attached to the command to identify to which cryptographic input/output processing the received command belongs to. The cryptographic processing unit rejects the execution of the command when having detected that the command is an incorrectly sequenced command in the cryptographic input/output processing to which the command belongs.

In response to a request from the host device, the storage device may provide to the host device the maximum number of cryptographic input/output processings which can be performed simultaneously by the storage device.

Still another aspect of the present invention relates to a host device. The host device exchanges data with a storage device that is capable of simultaneously performing a plurality of series of cryptographic input/output processing for encrypting data to be secured and inputting/outputting the data. The host device comprises a controller which divides the cryptographic input/output processing into a plurality of procedures and issuing commands sequentially to the storage device thereby allowing the storage device in order to make the storage device execute a procedure to be executed on the storage-device side, and a cryptographic processing unit which carries out encryption or decryption that is required of the cryptographic input/output processing. When the controller issues a command, the controller attaches identifying information to the command to identify to which one of the plurality of cryptographic input/output processings the command belongs.

Prior to the initiation of cryptographic input/output processing, the controller may issue a command to allocate a process system for performing the cryptographic input/output processing. This command may also be a process of allocating identifying information for identifying the cryptographic input/output processing.

Still another aspect of the present invention relates to a data input/output method. The method employs a storage device that is capable of simultaneously performing a plurality of series of cryptographic input/output processing for encrypting data to be secured and inputting/outputting the data, and retaining data to be exchanged through the cryptographic input/output processing. Upon performing the cryptographic input/output processing between the storage device and a host device, the method comprises a step in which the cryptographic input/output processing is divided into a plurality of procedures and the host device executes a procedure to be executed on the host-device side out of the procedures, a step in which the host device issues a command to the storage device in order to make the storage device execute a procedure to be executed on the storage-device side, a step in which the storage device receives the command, and a step in which the storage device executes the command. In this method, identifying information is attached to the command to identify to which one of the plurality of cryptographic input/output processings, being performed simultaneously by the storage device, the command belongs.

The method may also include the step of predetermining an upper-limit number of the cryptographic input/output processings that can be performed simultaneously by the storage device in accordance with performance of the storage device. The method may further include the steps of allowing the storage device to predetermine the upper-limit number of cryptographic input/output processings that the storage device can perform simultaneously in accordance with its own performance, and informing the host device of the upper limit. The method may further include the step of, prior to performing the cryptographic input/output processing, selecting and allocating identifying information for identifying the cryptographic input/output processing to be performed from among the prepared number of pieces of identifying information determined in the determining step.

The receiving step may include the steps of determining whether the received command is a correctly sequenced command in the cryptographic input/output processing, accepting the command successfully when the received command has been determined to be a correctly sequenced command, and rejecting the execution of the received command when the received command has been determined to be an incorrectly sequenced command. Alternatively, when the received command has been determined to be an incorrectly sequenced command, the execution of the cryptographic input/output processing to which the command belongs can be interrupted.

It is to be understood that any combination of the aforementioned components and any representations of the present invention being transformed among methods, apparatus, systems, storage media, and computer programs are also valid as the aspects of the present invention.

Moreover, this summary of the invention does not necessarily describe all necessary features so that the invention may also be sub-combination of these described features.

DETAILED DESCRIPTION OF THE INVENTION

The invention will now be described based on embodiments which do not intend to limit the scope of the present invention but exemplify the invention. All of the features and the combinations thereof described in the embodiments are not necessarily essential to the invention.

First Embodiment

Figure 1:
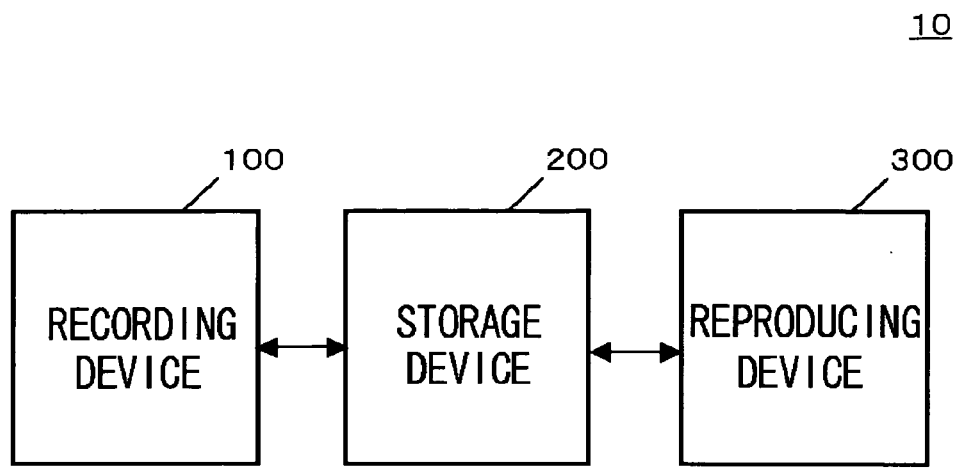
FIG. 1 is a diagram showing the entire configuration of a data management system according to a first embodiment.

FIG. 1 illustrates the entire configuration of a data management system 10 according to a first embodiment. The data management system 10 includes a recording device 100 for controlling the recording operation of data in a storage device 200, a reproducing device 300 for controlling the reproduction operation of the data recorded on the storage device 200, and the storage device 200 for storing and retaining data. The storage device 200 according to this embodiment is a drive-integrated storage device which includes not only a storage medium for retaining data but also a controller for controlling the exchange of data between a host device, such as the recording device 100 or the reproducing device 300, and the storage medium. By way of example, this embodiment employs a hard disk drive as the storage device 200 and will be described accordingly below.

In general, conventional hard disks were fixedly connected to one host device for use. However, the storage device 200 according to this embodiment is made detachable from a host device such as the recording device 100 or the reproducing device 300. That is, like CDs or DVDs, the storage device 200 according to this embodiment can be portably detached from the host device, allowed to be shared by a plurality of host devices such as the recording device 100, the reproducing device 300, and other recording/reproducing device capable of recording and reproduction.

In this manner, the storage device 200 according to this embodiment is intended to connect to a plurality of host devices, thus possibly allowed to connect to the host device of a third party other than its owner for reading the data stored therein. Suppose that the storage device 200 may store contents such as music or video to be protected by copyright or data to be secured such as confidential data of businesses or individuals. In this case, to prevent the secret data from leaking out, the storage device 200 itself is preferably provided with appropriate means for protecting the data, thereby being provided with a sufficient tamper resistance. In this regard, the storage device 200 according to this embodiment is adapted to encrypt secret data for an exchange with the host device. The storage device 200 is also provided with a secret data storage region different from an normal data storage region to store secret data, so that the secret data storage region can be accessed only via a cryptographic engine provided within the storage device 200. The cryptographic engine outputs secret data only to a host device that has been validated as authorized. Hereinafter, such a data protection function will also be referred to as the "secure function." The aforementioned configuration and function serve to properly protect the secret data stored in the storage device 200.

To make full use of the feature provided to the storage device 200 as a removable medium, normal data is preferably exchanged even with a host device that does not conform to the secure function. To this end, the storage device 200 according to this embodiment is compatible with the ATA (AT Attachment) of the ANSI (American National Standards Institute) standards to maintain compatibility with conventional hard disks. The aforementioned secure function is implemented as an extended ATA command. Once a command is issued, the ATA which employs a single interface cannot issue the next command because the bus is occupied until the preceding command is completed. However, as described above, the storage device 200 is adapted to have means for encrypted communications, thereby allowing secret data to be encrypted for input and output. This causes the time required for a command for input and output of secret data to be longer than the time required for a command for input and output of normal data because a relatively longer period of time is required for encryption or decryption. For example, suppose that a read command is issued to the storage device 200 to read secret data out of the storage device 200. In this case, the storage device 200 allows its own cryptographic engine to read the secret data on the secret data storage region, and then exchange a secret key with the host device to deliver the secret data to the host device. Thereafter, the secret data is encrypted using the secret key and then delivered to the bus. While processes such as the encryption and decryption are being executed, the bus is occupied by the command even though it is not actually being used.

To minimize such needless occupation of the bus and thereby use the bus efficiently for higher-speed processing, this embodiment is adapted to divide a series of cryptographic input/output processing for input and output of secret data into a plurality of procedures and thereby issue subdivided commands, so that the bus is deallocated as much as possible to allow other commands to be issued while processes such as encryption and decryption which do not use the bus are being performed.

However, dividing the cryptographic input/output processing for input and output of secret data into a plurality of procedures may cause the sequence of the procedures to be mixed up, possibly leading to a security hole. In this context, this embodiment allows the cryptographic engine of the storage device 200 to manage the sequence of commands executed for input and output of secret data, such that when an incorrectly sequenced command is received, the cryptographic engine rejects the execution of the command and returns an error response. Furthermore, assuming that the recording device 100 and the reproducing device 300 may simultaneously perform a plurality of recording or reproduction operations, this embodiment prepares a plurality of process systems in accordance with the process capability of the storage device 200. To manage the sequence of commands executed for each process system, a sequence ID for identifying a process system is assigned to the command for each process system, thereby allowing the sequence ID to identify to which process system the received command belongs.

Now, as an example of exchanging secret data, such a case is described below in which a recording/reproduction operation is performed on digital contents such as music or pictures. Although the contents themselves can be treated as secret data, this embodiment is adapted such that the contents are encrypted and the resulting encrypted contents themselves are exchanged as normal data. Data that is necessary to decrypt and utilize contents (referred to as license data), including a key for decrypting the encrypted contents (referred to as the content key), is exchanged as secret data using the aforementioned secure function. While maintaining a sufficient tamper resistance, this makes it possible to facilitate the exchange of data, thereby performing higher-speed processing with reduced power consumption. Hereinafter, among those commands issued by a host device such as the recording device 100 or the reproducing device 300 to the storage device 200, a command for the secure function is called the "secure command" and other commands are called the "ordinary command."

Figure 2:
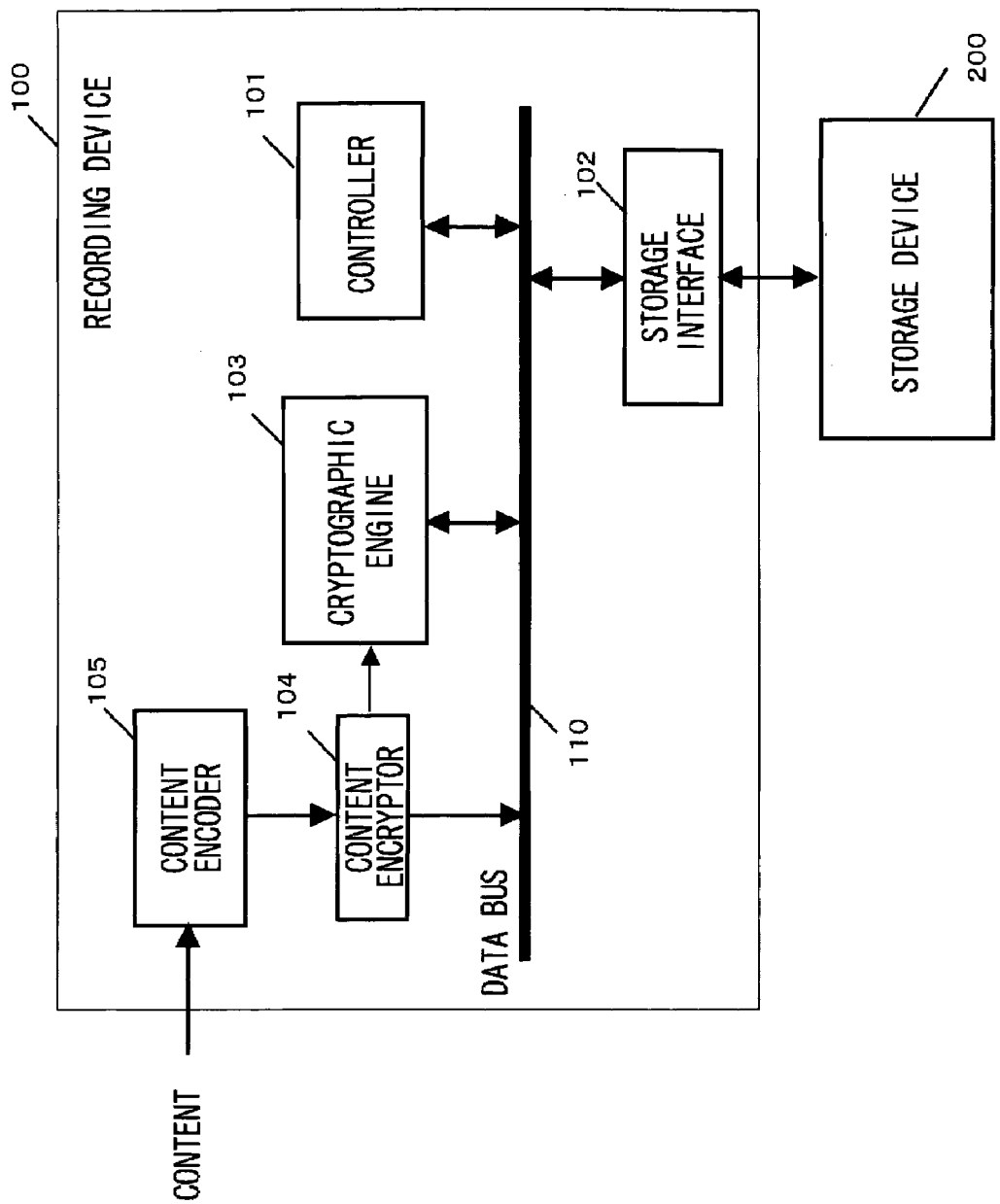
FIG. 2 is a diagram showing the internal configuration of a recording device according to the first embodiment.

FIG. 2 illustrates the internal configuration of the recording device 100 according to this embodiment. The hardware aspect of this configuration can be implemented using the CPU, memory, and other LSIs of any computer, while the software aspect can be implemented using a program with a recording control function loaded in the memory. In this figure, functional blocks are illustrated which are implemented through the cooperation of these components. Therefore, those skilled in the art will understand that these functional blocks can be realized in a variety of forms by means of only hardware, only software, or combinations thereof. The recording device 100 mainly includes a controller 101, a storage interface 102, a cryptographic engine 103, a content encryptor 104, a content encoder 105, and a data bus 110 for electrically connecting them.

The content encoder 105 encodes content acquired offline or online into the predetermined format. For example, image data acquired via a network may be encoded in the JPEG format or picture data acquired from a broadcast wave may be encoded in the MPEG format. The content encryptor 104 issues a secret key for encrypting content and a content key for decryption to encrypt the encoded content using the secret key. The encrypted content is stored in the storage device 200 via the data bus 110 and the storage interface 102. The content key is informed to the cryptographic engine 103 to be stored in the storage device 200 via the cryptographic engine 103. The cryptographic engine 103 controls encrypted communications with the storage device 200 in order to input license data including the content key into the storage device 200. The storage interface 102 controls the exchange of data with the storage device 200. The controller 101 collectively controls the components of the recording device 100.

Figure 3:
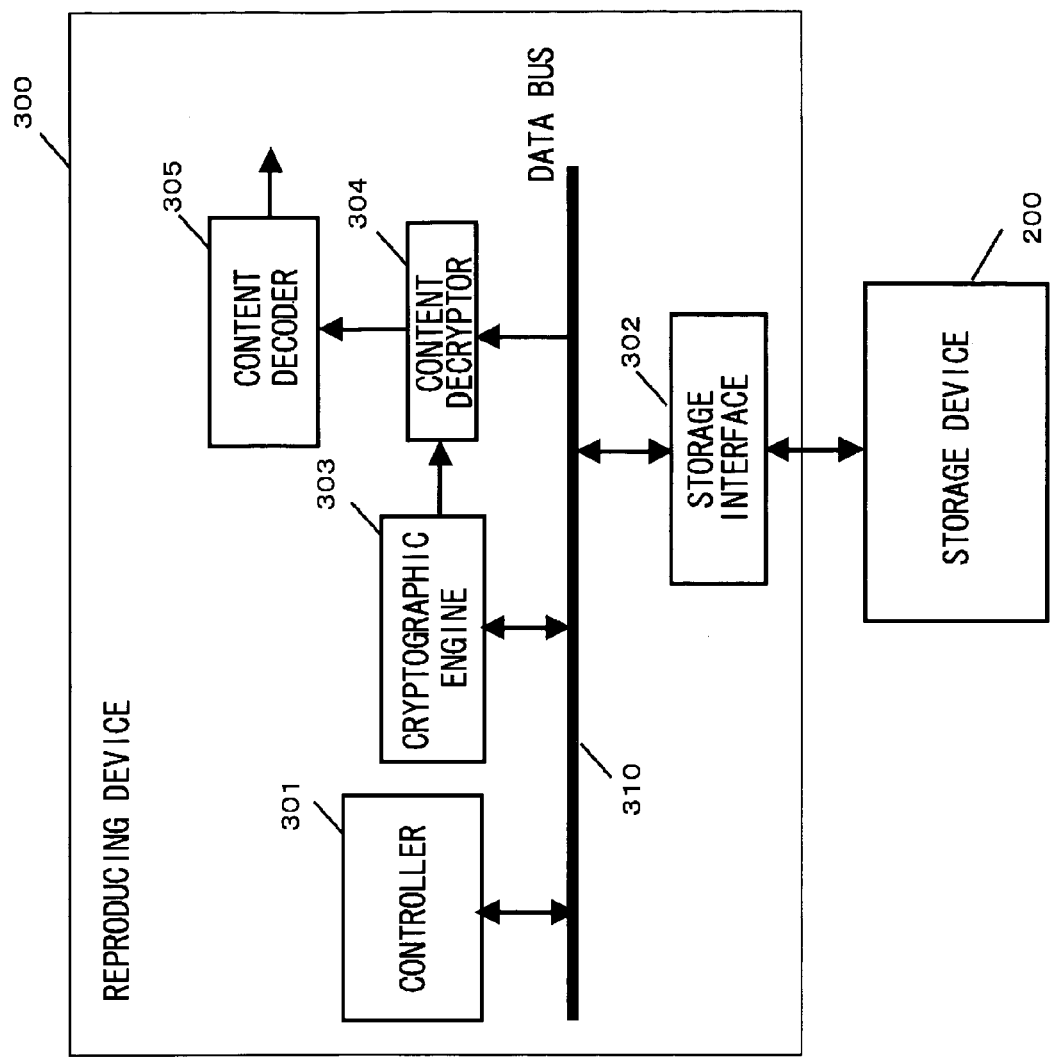
FIG. 3 is a diagram showing the internal configuration of a reproducing device according to the first embodiment.

FIG. 3 illustrates the internal configuration of the reproducing device 300 according to this embodiment. These functional blocks can also be implemented in various forms using only hardware, only software, or combinations thereof. The reproducing device 300 mainly includes a controller 301, a storage interface 302, a cryptographic engine 303, a decryptor 304, a content decoder 305, and a data bus 310 for electrically connecting them.

The storage interface 302 controls the exchange of data with the storage device 200. The cryptographic engine 303 controls encrypted communications with the storage device 200 in order to receive the license data including the license key from the storage device 200. The content decryptor 304 decrypts the encrypted content read out of the storage device 200 using the license key included in the license data acquired from the storage device 200. The content decoder 305 decodes the content decrypted by the content decryptor 304 for output. For example, image data would be delivered to a display device (not shown), while audio data would be delivered to a loudspeaker (not shown). The controller 301 collectively controls the components of the reproducing device 300.

Figure 4:
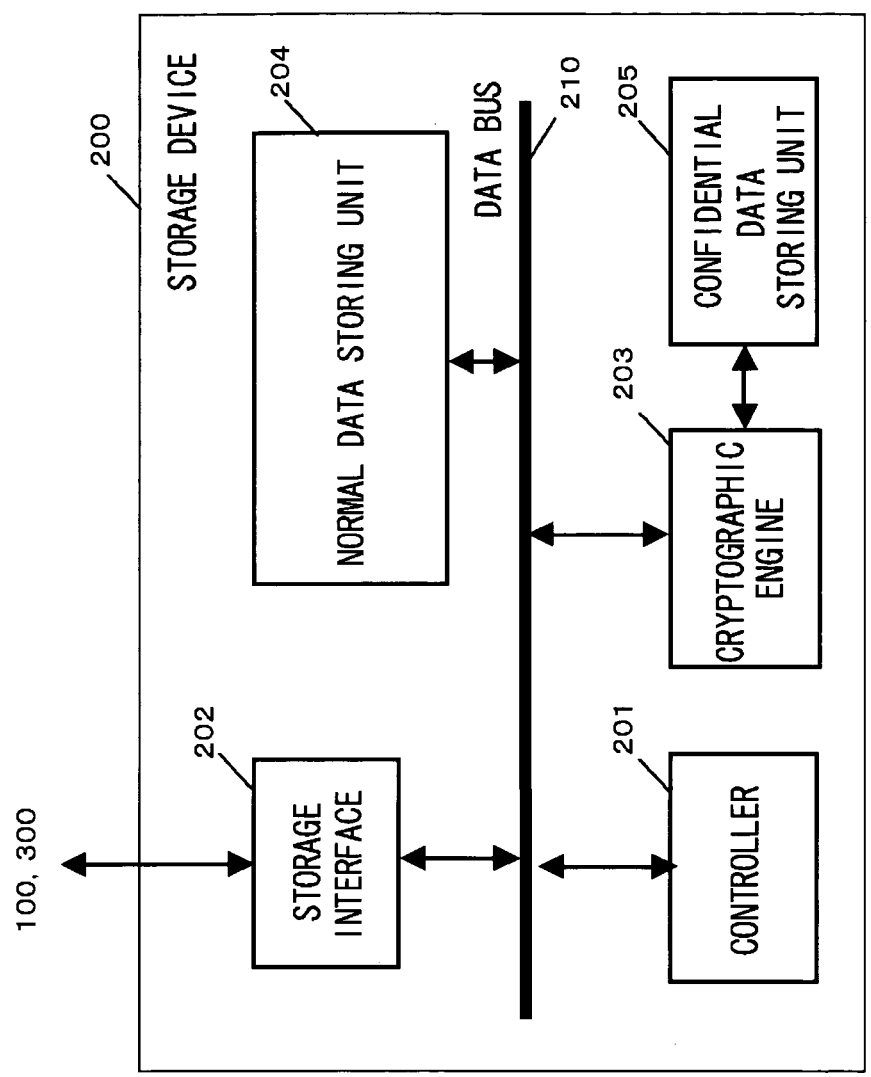
FIG. 4 is a diagram showing the internal configuration of a storage device according to the first embodiment.

FIG. 4 illustrates the internal configuration of the storage device 200 according to this embodiment. The storage device 200 mainly includes a controller 201, a storage interface 202, a cryptographic engine 203, a normal data storing unit 204, a confidential data storing unit 205, and a data bus 210 for electrically connecting them.

The storage interface 202 controls the exchange of data with the recording device 100 and the reproducing device 300. The cryptographic engine 303 controls the exchange of secret data such as license data including a content key with the recording device 100 and the reproducing device 300. The normal data storing unit 204 stores encrypted content or normal data. The confidential data storing unit 205 stores secret data such as license data containing a content key. The controller 201 collectively controls the components of the storage device 200. The normal data storing unit 204 can be directly accessed from outside (for input and output of data), whereas the confidential data storing unit 205, which is controlled by the cryptographic engine 203, can be accessed only via the cryptographic engine 203 (for input and output of data).

Figure 5:
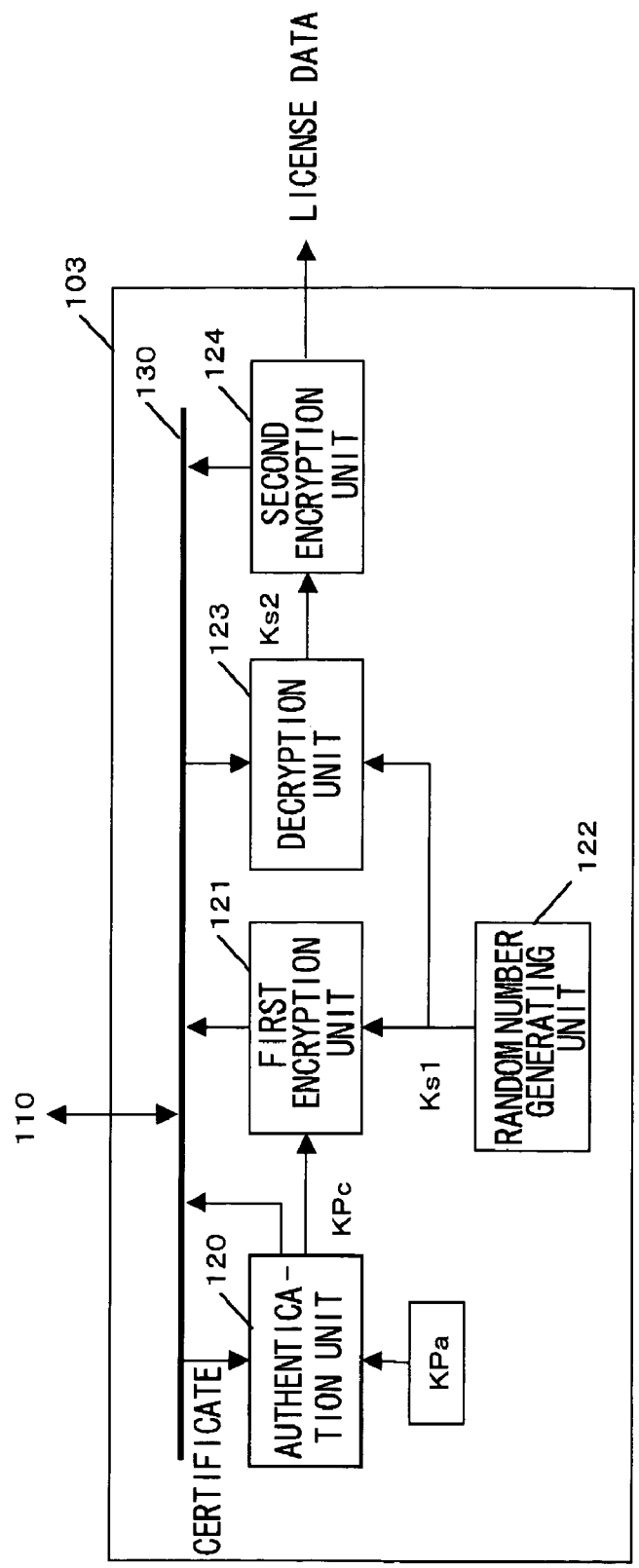
FIG. 5 is a diagram showing the internal configuration of a cryptographic engine in the recording device shown in FIG. 2.

FIG. 5 illustrates the internal configuration of the cryptographic engine 103 in the recording device 100 shown in FIG. 2. The cryptographic engine 103 includes an authentication unit 120, a first encryption unit 121, a random number generation unit 122, a decryption unit 123, a second encryption unit 124, and a local bus 130 for electrically connecting at least some of these components.

The authentication unit 120 authenticates a certificate acquired from the storage device 200. The certificate contains plaintext information (referred to as the certificate body) including a public key and an electronic signature attached to the certificate body. The electronic signature is data that is obtained by encrypting the result of a hash operation performed on the certificate body using a root key Kpa provided by a third-party organization or a certification authority (not shown). The root key Kpa is a non-public key that is stringently controlled by the certification authority, serving as the secret key of the certification authority. The authentication unit 120 has an authentication key KPa that is used with the root key Kpa in pair. The authentication key KPa is a public key that verifies the validity of a certificate. The validity of a certificate is verified through the comparison of the result of a hash operation performed on the certificate body of the certificate to be verified with the result of decrypting the electronic signature using the authentication key KPa. When both the results agree with each other, the certificate is determined to be valid. The process for judging the validity of a certificate and approving the valid certificate is called "authentication." If the authentication has been performed successfully, the authentication unit 120 acquires the public key KPc of the storage device 200 to send it to the first encryption unit 121. If the authentication has been performed unsuccessfully, the authentication unit 120 outputs an error message.

The random number generation unit 122 creates a challenge key Ks1 for temporary use in encrypted communications with the storage device 200. A challenge key Ks1 is created using random numbers each time an encrypted communication is carried out, thereby minimizing the risk of the challenge key Ks1 being revealed. The challenge key Ks1 created is sent to the first encryption unit 121 and the decryption unit 123. In order to inform the storage device 200 of the challenge key Ks1, the first encryption unit 121 encrypts the challenge key Ks1 using the public key KPc of the storage device 200 captured by the authentication unit 120 to create an encrypted symmetric key E (KPc, Ks1), where function E represents "encryption" and E (KPc, Ks1) represents the encryption of ks1 using KPc.

The decryption unit 123 decrypts the data encrypted using the challenge key Ks1. Since a session key Ks2 issued at the storage device 200 is encrypted using the challenge key Ks1 to be supplied from the storage device 200, the decryption unit 123 acquires the challenge key Ks1 created at the random number generation unit 122 to decrypt the session key Ks2. The decrypted session key Ks2 is sent to the second encryption unit 124. The second encryption unit 124 acquires license data containing the content key that has been issued when the content encryptor 104 encrypts the content to encrypt the license data using the session key Ks2 issued at the storage device 200.

Referring to FIG. 5, among the components of the cryptographic engine 103, the local bus 130 electrically connects the authentication unit 120, the first encryption unit 121, the decryption unit 123, and the second encryption unit 124, which are also connected to the data bus 110 of the recording device 100 via the local bus 130. Although various modifications can be made to the connection of these components, this embodiment is given a special consideration such that the random number generation unit 122 for generating challenge keys is not directly connected to the data bus 110. This serves to prevent each key used in the cryptographic engine 103 from being leaked out via other components of the recording device 100, thereby providing improved security.

Figure 6:
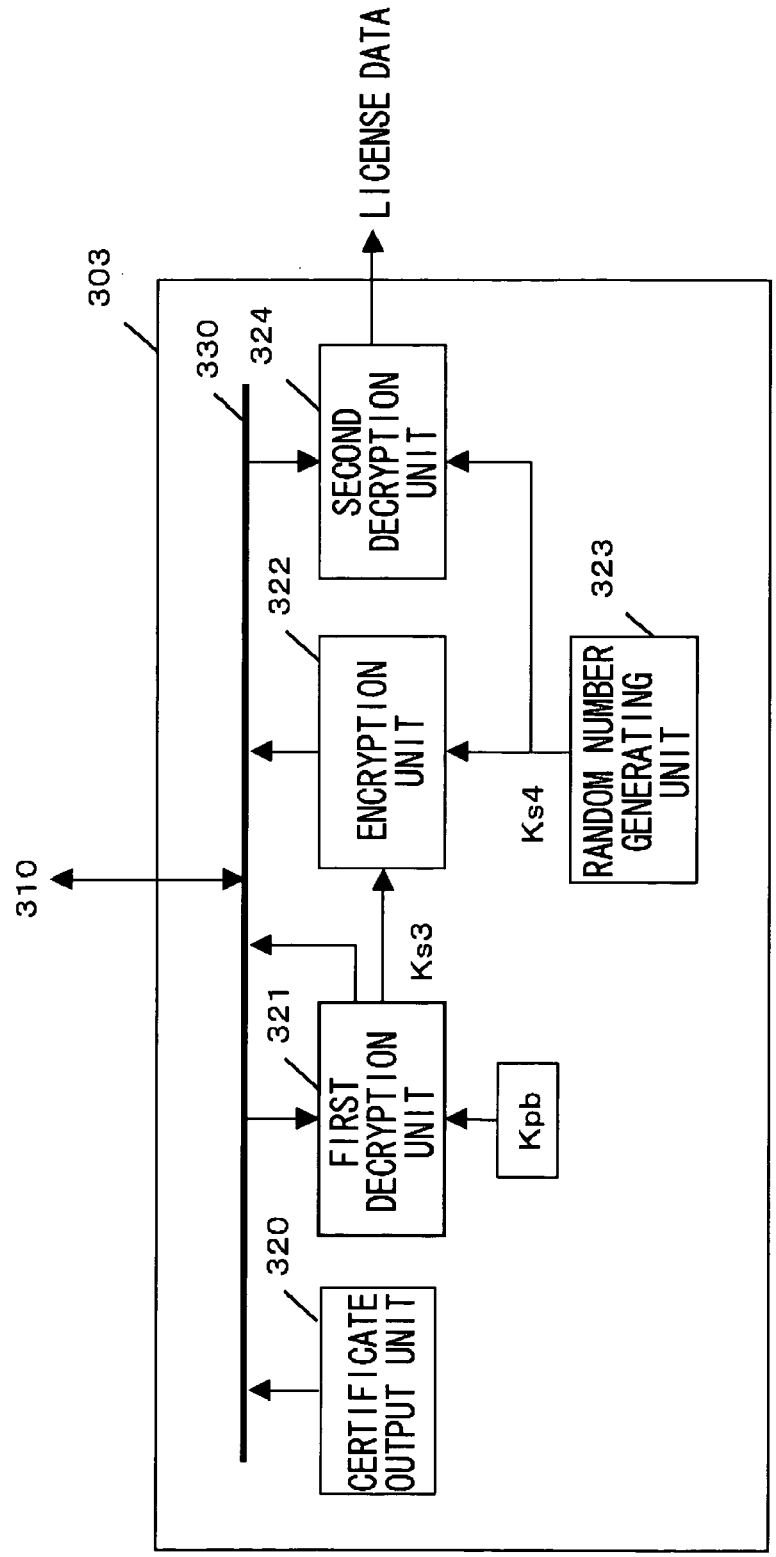
FIG. 6 is a diagram showing the internal configuration of a cryptographic engine in the reproducing device shown in FIG. 3.

FIG. 6 illustrates the internal configuration of the cryptographic engine 303 of the reproducing device 300 shown in FIG. 3. The cryptographic engine 303 includes a certificate output unit 320, a first decryption unit 321, an encryption unit 322, a random number generation unit 323, second decryption unit 324, and a local bus 330 for electrically connecting at least some of these components.

The certificate output unit 320 outputs a certificate of the reproducing device 300. The certificate can be retained in the certificate output unit 320, or alternatively may be retained in a certificate storage unit (not shown) to be read out later. The certificate includes the certificate body containing the public key KPb for the reproducing device 300 and an electronic signature attached to the certificate body. Like the certificate of the storage device 200, the electronic signature is data that is encrypted using the root key Kpa of the certification authority. Using the secret key Kpb, the first decryption unit 321 decrypts the data encrypted by the public key KPb. Since a challenge key Ks3 issued at the storage device 200 is encrypted using the public key KPb of the reproducing device 300 for supply from the storage device 200, the first decryption unit 321 uses its own secret key KPb for decryption to acquire the challenge key Ks3. The challenge key Ks3 acquired is sent to the encryption unit 322. The random number generation unit 323 creates a session key Ks4 for temporary use in encrypted communications with the storage device 200. The session key Ks4 created is sent to the encryption unit 322 and the second decryption unit 324.

In order to inform the storage device 200 of the session key Ks4, the encryption unit 322 encrypts the session key Ks4 using the challenge key Ks3 acquired by the first decryption unit 321. The second decryption unit 324 decrypts the data encrypted using the session key Ks4. Since the license data is encrypted using the session key Ks4 to be supplied from the storage device 200, the second decryption unit 324 uses the session key Ks4 created at the random number generation unit 323 for decryption to acquire the license data. The license data acquired is sent to the content decryptor 304, which in turn uses the content key included in the license data to decrypt the encrypted content.

In the cryptographic engine 303 shown in FIG. 6, various modifications can be conceivably made to the connection of each components. This embodiment is adapted such that the random number generation unit 323 for generating challenge keys is not connected directly to the data bus 310, thereby preventing those secret keys used within the cryptographic engine 303 from leaking out.

Figure 7:
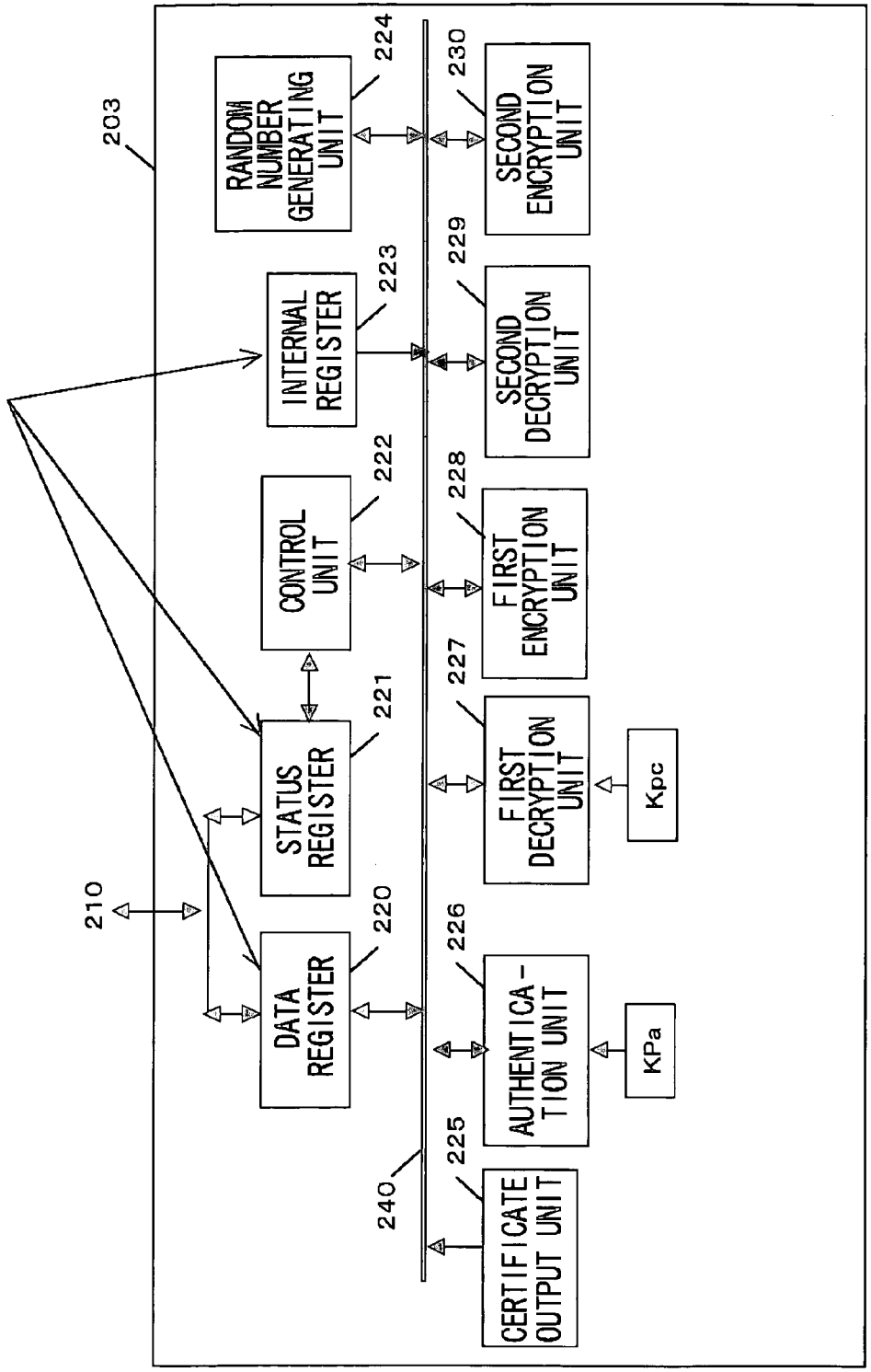
FIG. 7 is a diagram showing the internal configuration of a cryptographic engine in the storage device shown in FIG. 4.

FIG. 7 illustrates the internal configuration of the cryptographic engine 203 of the storage device 200 shown in FIG. 4. These functional blocks can also be implemented in various forms using only hardware, only software, or combinations thereof. The cryptographic engine 203 includes a data register 220, a status register 221, a control unit 222, an internal register 223, a random number generation unit 224, a certificate output unit 225, an authentication unit 226, a first decryption unit 227, a first encryption unit 228, a second decryption unit 229, a second encryption unit 230, and a local bus 240 for electrically connecting at least some of these components.

The data register 220 is used for input and output of data, serving to relay the input and output of data between the cryptographic engine 203 and a circuit external thereto. The status register 221 retains an execution instruction that allows the controller 201 to instruct the cryptographic engine 203 to execute a secure command received by the controller 201 from the recording device 100 or the reproducing device 300. The status register 221 also retains information such as status information on the process status of the secure command or process results or the type of an execution command indicative of the type of a command being executed or having been executed, which the cryptographic engine 203 informs to the controller 201.

Upon reception of a secure command from the controller of the recording device 100 or the reproducing device 300, the controller 201 of the storage device 200 stores an instruction for executing (initiating) the command in the status register 221. For example, each secure command is numbered in the order in which they are executed. Then, the number of a secure command received by the controller 201 and the sequence ID indicative of the process system to which the secure command belongs are stored in the status register 221, thereby instructing the cryptographic engine 203 to execute the command. The control unit 222 starts processing in response to a new execution instruction being stored in the status register 221.

The control unit 222 stores status information in the status register 221, which indicates the process status and the process result of the command informed by the controller 201. The process status can be represented with a flag indicating two statuses: "Busy" indicative of a process being performed and "Ready" indicative of a process being not performed. The process result can be represented with a flag indicating two statuses: "Normal" indicative of a process having been successfully performed and "Error" indicative of a process having been aborted. Like the execution instruction, the type of an execution command stored in the status register 221 can be the number given to the secure command.

For each process system, the internal register 223 retains temporary secret information required to execute a command and the process result obtained by processing a command. That is, the internal register 223 includes a region for retaining secret information for each process system (sequence ID). Temporary secret information includes a key for use in encrypted communications with the recording device 100 or the reproducing device 300 or non-encrypted license data.

Upon reception of a secure command attached with a sequence ID issued by the controller of the recording device 100 or the reproducing device 300, the controller 201 refers to the status register 221 to check the process status of the process system to which the secure command belongs in order to determine whether the secure command is to be executed. If no other command of that process system is being executed, the controller 201 stores the received sequence ID and the number of the received secure command in the execution instruction of the status register 221 in order to instruct the cryptographic engine 203 to execute the command.

The control unit 222 refers to the status register 221 to transmit a control signal to the other components within the cryptographic engine 203 in response to the execution instruction stored in the status register 221. First, the control unit 222 acquires the number of the secure command and the sequence ID which are stored as an execution instruction in the status register 221. Then, referring again to the status register 221, the control unit 222 checks the process status of the process system to which the secure command belongs in order to determine whether the secure command is to be executed. If the immediately preceding command of the process system has been successfully completed and the received command is a correctly sequenced command, the control unit 222 permits the command to be executed, the type of the execution command of the status register 221 to be changed to the number of the command, and the status information to be changed to "Busy." If the immediately preceding command of the process system is being executed or aborted or the received command is an incorrectly sequenced command, the control unit 222 rejects the execution of the command and changes the status information of the status register 221 to "Error." Alternatively, the cryptographic input/output processing to which the incorrectly sequenced command belongs may be interrupted. That is, the type of the execution command of the status register 221 may be initialized such that the cryptographic input/output processing is not be accepted unless it is started over. This makes it possible to provide further improved security measures against unauthorized access. On the other hand, some commands may not be influenced by the process result of the immediately preceding command. In this case, the execution of those commands may be permitted.

The random number generation unit 224 creates the session key Ks2 or the challenge key Ks3 which are temporarily used for encrypted communications with the recording device 100 or the reproducing device 300. The certificate output unit 225 outputs the certificate of the storage device 200. The certificate may be retained in the certificate output unit 225 or in a predetermined storage region of the storage device 200, e.g., in the confidential data storing unit 205 to be read out later. The certificate includes the certificate body of the public key KPc of the storage device 200 and the electronic signature attached to the certificate body. The electronic signature is encrypted using the root key Kpa of the certification authority. The authentication unit 226 authenticates the certificate acquired from the reproducing device 300. The authentication unit 226 acquires the electronic signature contained in the certificate to authenticate the validity thereof using the authentication key KPa. If the authentication has been performed successfully, the authentication unit 226 acquires the public key KPb of the reproducing device 300 included in the certificate for storage in the internal register 223. If the authentication has been performed unsuccessfully, the authentication unit 226 delivers an error message to the control unit 222.

The first decryption unit 227 decrypts data that has been encrypted using a public key of public-key cryptography. More specifically, using its own secret key Kpc, the first decryption unit 227 decrypts the data that has been encrypted using its own public key KPc. The first encryption unit 228 encrypts data using a public key of public-key cryptography. More specifically, the first encryption unit 228 uses the public key KPb of the reproducing device 300 received from the reproducing device 300 to encrypt the challenge key Ks3 issued by the random number generation unit 224. The second decryption unit 229 decrypts data that has been encrypted using a key of symmetric-key cryptography. More specifically, using the session key Ks2 or the challenge key Ks3, the second decryption unit 229 decrypts data that has been encrypted using the session key Ks2 or the challenge key Ks3 which has been issued by the random number generation unit 224, respectively. The second encryption unit 230 encrypts data using a key of symmetric-key cryptography. More specifically, using the challenge key Ks1 issued by the recording device 100 or the session key Ks4 issued by the reproducing device 300, the second encryption unit 230 encrypts the session key Ks2 or the license data that has been issued by the random number generation unit 224.

Now, a brief explanation is given to the procedure performed until the recording device 100 writes license data in the storage device 200 and the procedure performed until the reproducing device 300 reads the license data stored in the storage device 200. After that, a detailed explanation is given to the simultaneous processing performed on a plurality of sequences according to this embodiment.

Figure 8:
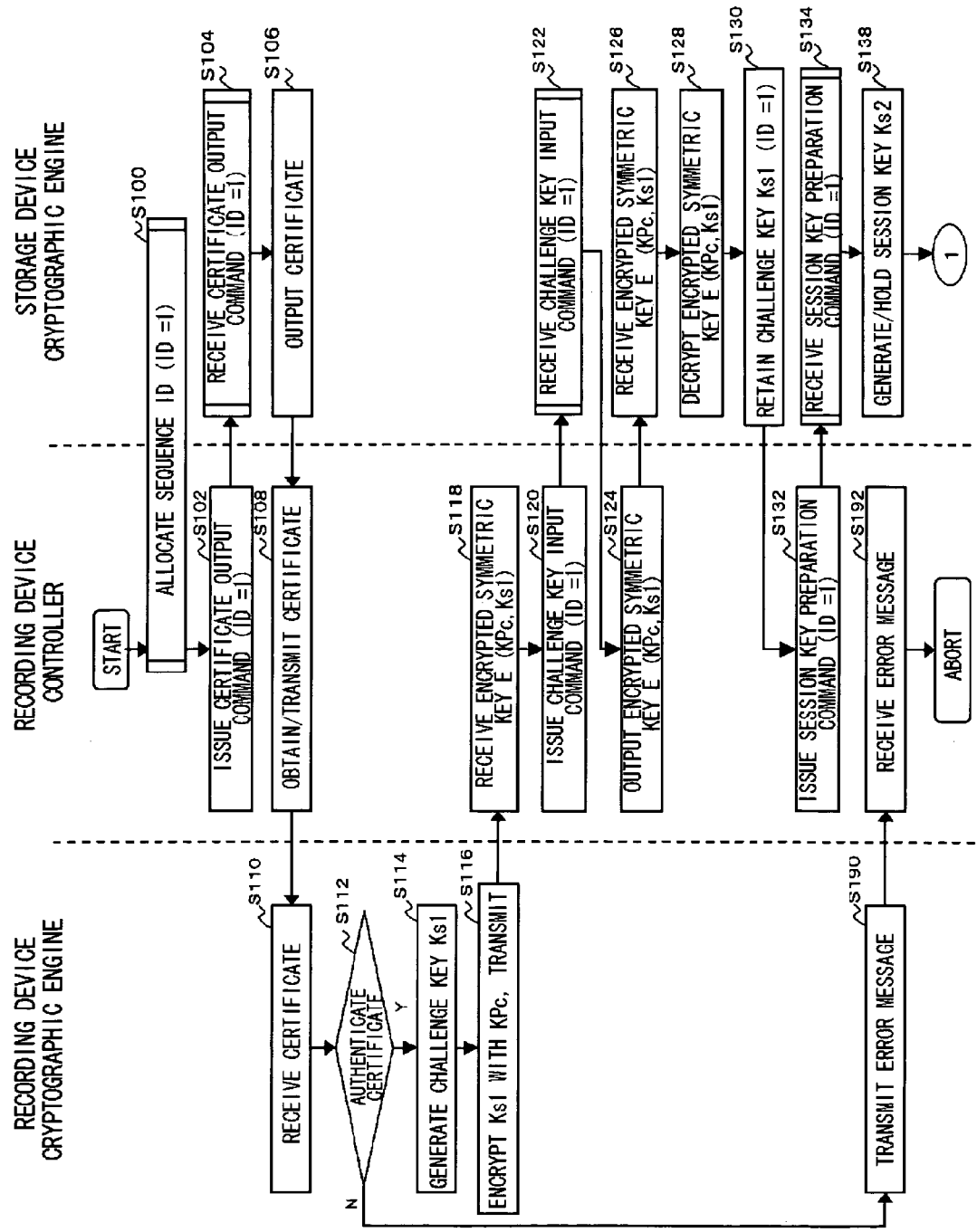
FIG. 8 is a diagram showing the procedures performed until the recording device writes license data in the storage device.
Figure 9:
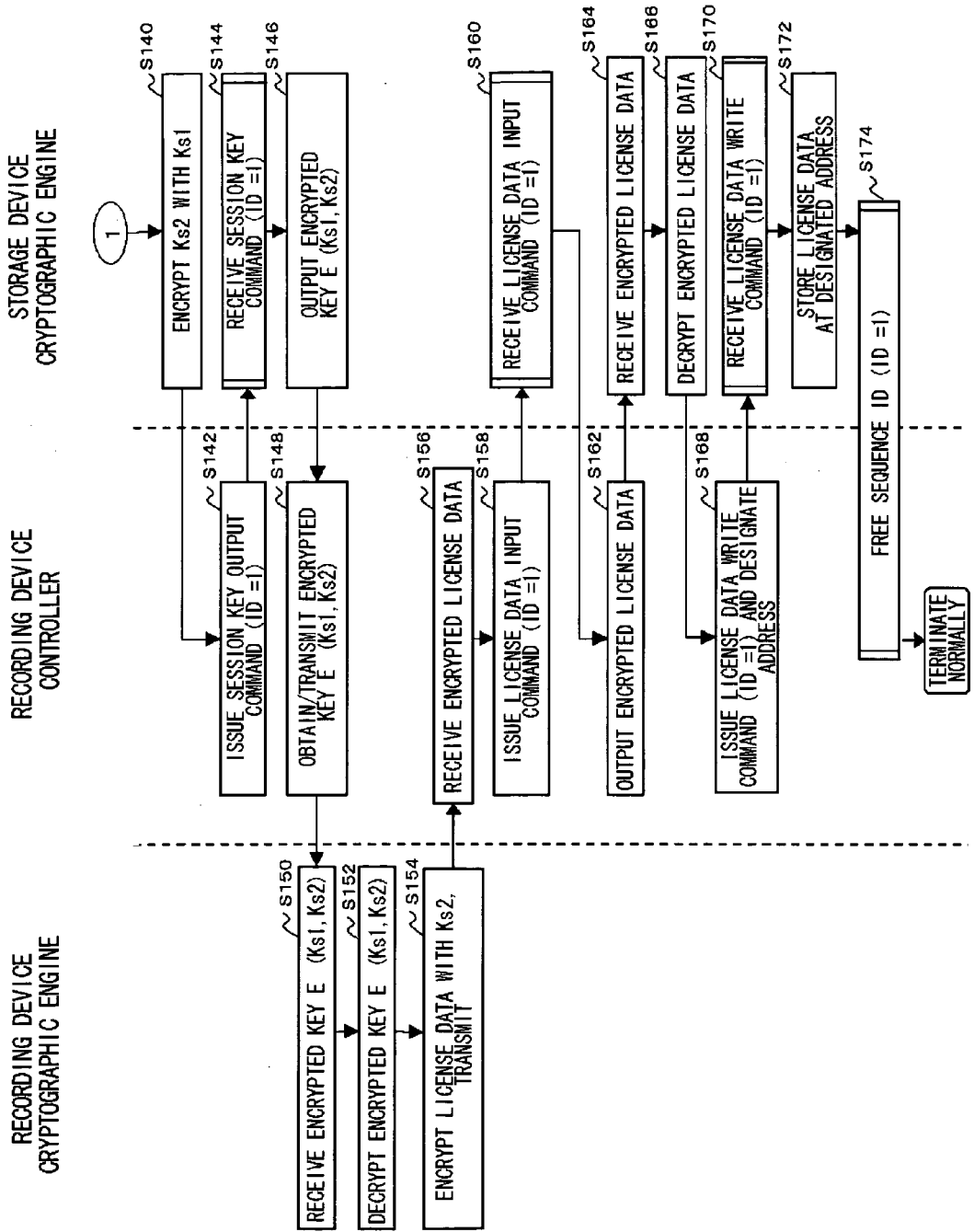
FIG. 9 is a diagram showing the procedures performed until the recording device writes license data in the storage device.

FIGS. 8 and 9 show a series of cryptographic input/output processing performed until the recording device 100 writes license data in the storage device 200. The controller 101 of the recording device 100 issues a secure command to the storage device 200 to allow the storage device 200 to execute cryptographic input/output processing. Upon reception of a secure command from the recording device 100, the controller 201 of the storage device 200 instructs the control unit 222 of the cryptographic engine 203 via the status register 221 to execute the secure command. To exchange data between the recording device 100 and the cryptographic engine 203, the data is similarly exchanged via the controller 201 and the data register 220. For the sake of simplicity, a description is given below assuming that a series of cryptographic input/output processing are executed between the recording device 100 and the cryptographic engine 203 of the storage device 200.

First, a process for allocating a sequence ID is performed between the controller 101 of the recording device 100 and the cryptographic engine 203 of the storage device 200 (S100). This process will be detailed with reference to FIGS. 13 and 14. Here, the description is put forward assuming that a sequence ID "1" has been allocated. When the sequence ID is allocated, the controller 101 issues a certificate output command (sequence ID=1) to the cryptographic engine 203 (S102). When the cryptographic engine 203 receives the certificate output command successfully (S104), the control unit 222 reads the certificate via the certificate output unit 225 to send it to the controller 101 (S106). If the cryptographic engine 203 cannot receive the certificate output command successfully, the cryptographic engine 203 returns an error message to the controller 101, which will be detailed later.

Upon reception of the certificate from the storage device 200, the controller 101 sends it to the cryptographic engine 103 of the recording device 100 (S108). When the cryptographic engine 103 receives the certificate of the storage device 200 (S110), the authentication unit 120 authenticates the validity of the acquired certificate using the authentication key KPa (S112). If the certificate has not been approved ("N" in S112), the authentication unit 120 sends an error message to the controller 101 (S190). Upon reception of the error message (S192), the controller 101 aborts the process.

If the certificate has been approved ("Y" in S112), the cryptographic engine 103 allows the random number generation unit 122 to create the challenge key Ks1 (S114). Then, the first encryption unit 121 is allowed to encrypt the challenge key Ks1 using the public key KPc of the storage device 200 acquired from the certificate to create an encrypted symmetric key E (KPc, Ks1), which is in turn sent to the controller 101 (S116). Upon reception of the encrypted symmetric key E (KPc, Ks1), the controller 101 issues a challenge key input command (sequence ID=1) to the cryptographic engine 203 (S120). When the cryptographic engine 203 successfully receives the challenge key input command (S122), the controller 101 delivers the encrypted symmetric key E (KPc, Ks1) to the cryptographic engine 203 (S124). When the cryptographic engine 203 receives the encrypted symmetric key E (KPc, Ks1) (S126), the cryptographic engine'203 allows the control unit 222 to provide the received encrypted symmetric key E (KPc, Ks1) to the first decryption unit 227. The first decryption unit 227 decrypts the encrypted symmetric key E (KPc, Ks1) using its own secret key Kpc to acquire the challenge key Ks1 (S128), which is in turn provided to the control unit 222. The control unit 222 stores the challenge key Ks1 (sequence ID=1) in the region of sequence ID=1 in the internal register 223 (S130).

Subsequently, the controller 101 issues a session key preparation command (sequence ID=1) to the cryptographic engine 203 (S132). When the cryptographic engine 203 receives the session key preparation command successfully (S134), the random number generation unit 224 creates a session key Ks2, which is in turn provided to the control unit 222. The control unit 222 stores the session key Ks2 (sequence ID=1) in the region of sequence ID=1 in the internal register 223 (S138). Subsequently, the control unit 222 reads the challenge key Ks1 (sequence ID=1) on the region of sequence ID=1 of the internal register 223, allowing the session key Ks2 (sequence ID=1) created in the random number generation unit 224 and the challenge key Ks1 (sequence ID=1) read out of the internal register 223 to be provided to the second encryption unit 230. The second encryption unit 230 encrypts the session key Ks2 (sequence ID=1) using the challenge key Ks1 (sequence ID=1) to create an encrypted symmetric key E (Ks1, Ks2), which is then stored in the region of sequence ID=1 of the internal register 223 (S140).

Subsequently, the controller 101 issues a session key output command (sequence ID=1) to the cryptographic engine 203 (S142). Upon receiving successfully the session key output command (S144), the cryptographic engine 203 reads the encrypted symmetric key E(Ks1, Ks2) on the region of sequence ID=1 of the internal register 223 for output to the controller 101 (S146). Upon reception of the encrypted symmetric key E(Ks1, Ks2) from the storage device 200, the controller 101 sends it to the cryptographic engine 103 (S148). When the cryptographic engine 103 receives the encrypted symmetric key E(Ks1, Ks2) from the controller 101 (S150), the decryption unit 123 decrypts the encrypted symmetric key E(Ks1, Ks2) using the challenge key Ks1 created by the random number generation unit 122 to acquire the session key Ks2 (S152).

Subsequently, the cryptographic engine 103 allows the second encryption unit 124 to encrypt the license data, which contains the content key of the content issued by the content encryptor 104, using the session key Ks2 acquired by the decryption unit 123 to create the encrypted license data, which is then sent to the controller 101 (S154). Upon reception of the encrypted license data (S156), the controller 101 issues a license data input command (sequence ID=1) to the cryptographic engine 203 (S158). When the cryptographic engine 203 receives the license data input command successfully (S160), the controller 101 delivers the encrypted license data to the cryptographic engine 203 (S162). When the cryptographic engine 203 receives the encrypted license data (S164), the control unit 222 provides the received encrypted license data to the second decryption unit 229 and reads the session key Ks2 (sequence ID=1) on the region of sequence ID=1 of the internal register 223 for delivery to the second decryption unit 229. The second decryption unit 229 decrypts the encrypted license data using the session key Ks2 (sequence ID=1) to acquire the license data. The control unit 222 stores the license data in the region of sequence ID=1 of the internal register 223 (S166).

Subsequently, the controller 101 issues a license data write command (sequence ID=1) to the cryptographic engine 203 to specify the write address of the license data (S168). When the cryptographic engine 203 receives the license data write command successfully (S170), the control unit 222 reads the license data stored in the region of sequence ID=1 of the internal register 223 for storage at the specified address of the confidential data storing unit 205 (S172). Finally, a process for deallocating the sequence ID is performed between the controller 101 and the cryptographic engine 203 (S174). This process will be described in more detail with reference to FIG. 15. Through the aforementioned procedures, the license data for decrypting content is recorded in the storage device 200.

As described above, in this embodiment, cryptographic input/output processing for writing license data is divided into secure commands such as the certificate output command (S102), the challenge key input command (S120), the session key preparation command (S132), the session key output command (S142), the license data input command (S158), and the license data write command (S168), thereby assigning the sequence ID to a series of cryptographic input/output processing. This makes it possible to identify to which process system a secure command belongs even when a plurality of cryptographic input/output processing are executed simultaneously. This allows for properly managing the sequence of the secure commands and securely managing keys or data exchanged using the secure commands for each process system.

Figure 10:
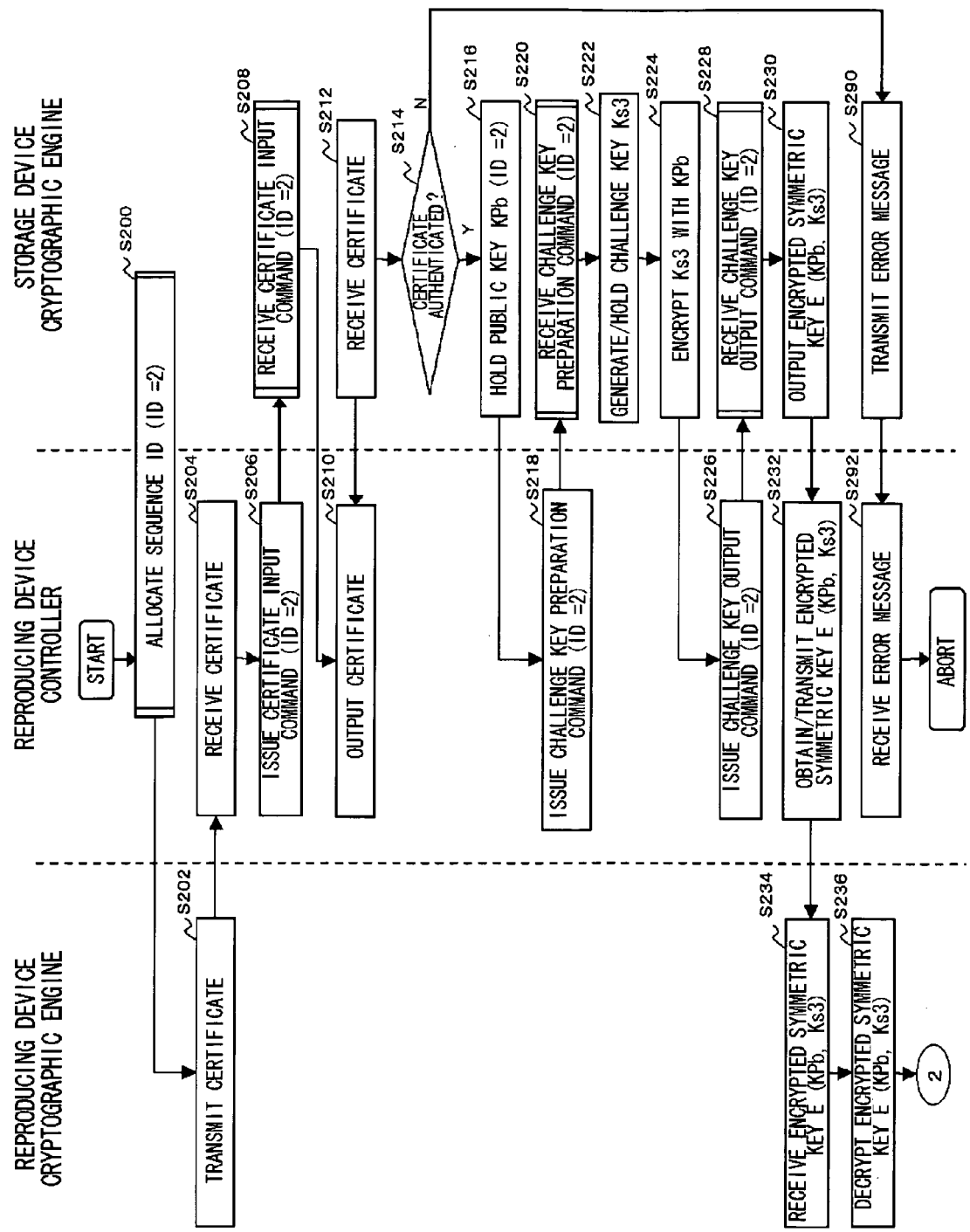
FIG. 10 is a diagram showing the procedures performed until the reproducing device reads license data in the storage device.
Figure 11:
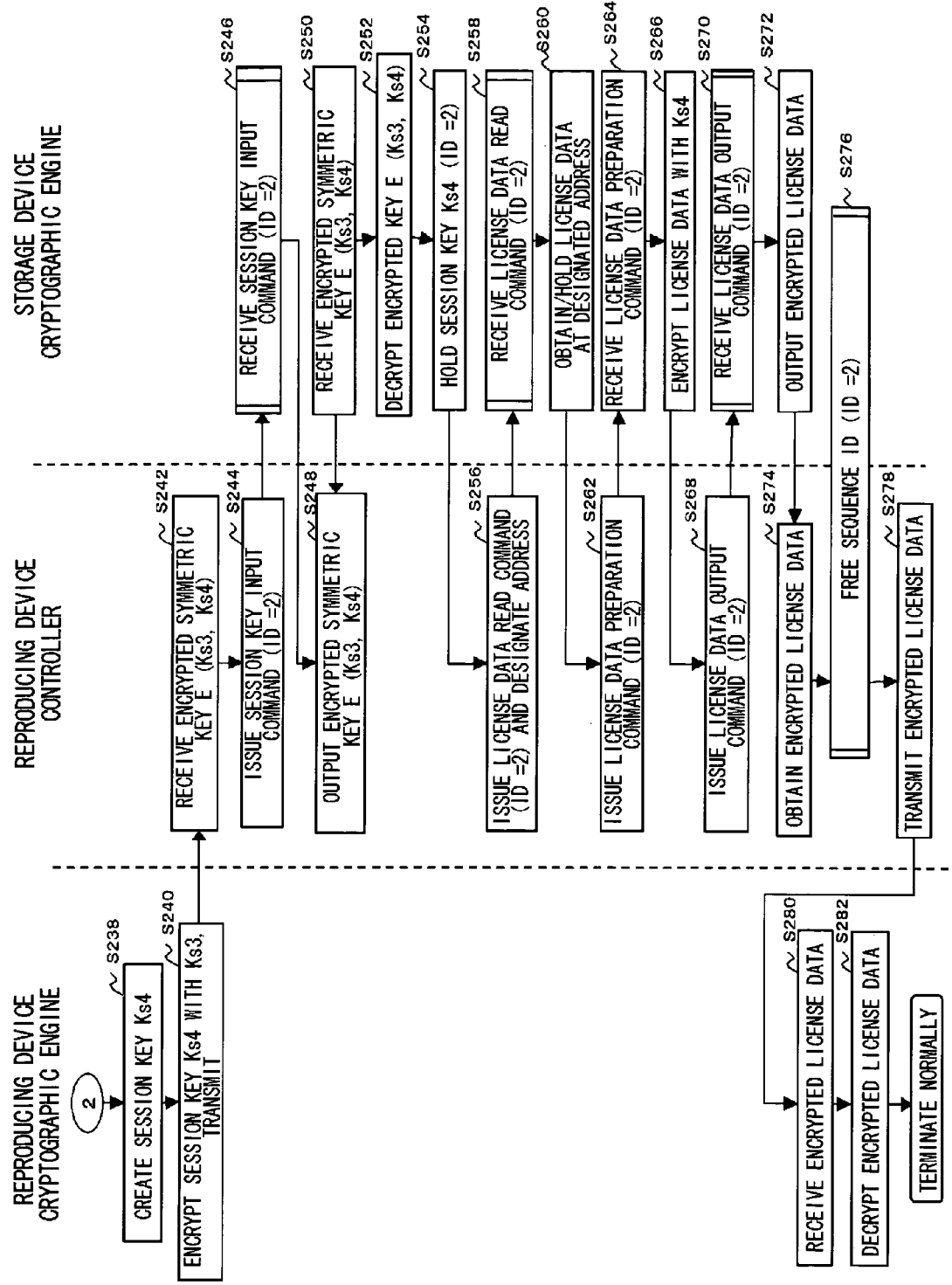
FIG. 11 is a diagram showing the procedures performed until the reproducing device reads license data in the storage device.

FIGS. 10 and 11 show the procedures performed until the reproducing device 300 reads license data out of the storage device 200. Like the procedures performed until the recording device 100 shown in FIGS. 8 and 9 writes license data into the storage device 200, a command is transmitted to the cryptographic engine 203 via the controller 201 and the status register 221 of the storage device 200 when the controller 301 of the reproducing device 300 issues the secure command to allow the storage device 200 to execute the cryptographic input/output processing. However, for the sake of simplicity, a description is given below assuming that a series of cryptographic input/output processing are executed between the reproducing device 300 and the cryptographic engine 203.

First, a process for allocating a sequence ID is performed between the controller 301 of the reproducing device 300 and the cryptographic engine 203 of the storage device 200 (S200). This process will be detailed with reference to FIGS. 13 and 14. Here, the description is put forward assuming that a sequence ID "2" has been allocated. When the sequence ID is allocated, the cryptographic engine 303 of the reproducing device 300 allows the certificate output unit 320 to send a certificate to the controller 301 (S202). Upon reception of the certificate from the cryptographic engine 303 (S204), the controller 301 issues a certificate input command (sequence ID=2) to the cryptographic engine 203 (S206). When the cryptographic engine 203 receives successfully the certificate input command (S208), the controller 301 delivers the certificate to the cryptographic engine 203 (S210). In this case, if the cryptographic engine 203 cannot receive the certificate input command successfully, the cryptographic engine 203 returns an error message to the controller 301, which will be detailed later.

When the cryptographic engine 203 receives the certificate of the reproducing device 300 (S212), the authentication unit 226 authenticates the validity of the acquired certificate using the authentication key KPa (S214). If the certificate has not been approved ("N" in S214), the authenticating portion 226 sends an error message to the controller 301 (S290). Upon reception of the error message (S292), the controller 301 aborts the process.

If the certificate has been approved ("Y" in S214), the control unit 222 acquires the public key KPb of the reproducing device 300 from the certificate to stores it on the region of sequence ID=2 of the internal register 223 (S216). Subsequently, the controller 301 issues a challenge key preparation command (sequence ID=2) to the cryptographic engine 203 (S218). When the cryptographic engine 203 receives the challenge key preparation command successfully (S220), the random number generation unit 224 creates a challenge key Ks3, which is in turn provided to the control unit 222. The control unit 222 stores it in the region of sequence ID=2 in the internal register 223 (S222). Then, the control unit 222 allows the challenge key Ks3 created and the public key KPb (sequence ID=1) of the reproducing device 300 read on the region of sequence ID=1 of the internal register 223 to be provided to the first encryption unit 228. Then, the first encryption unit 228 encrypts the challenge key Ks3 provided using the public key KPb of the reproducing device 300 to create an encrypted key E (KPb, Ks3), which is in turn temporarily stored in the region of sequence ID=2 of the internal register 223 (S244). Subsequently, the controller 301 issues a challenge key output command (sequence ID=2) to the cryptographic engine 203 (S226). When the cryptographic engine 203 receives successfully the challenge key output command (S228), the control unit 222 reads the encrypted key E (KPb, Ks3) on the region of sequence ID=1 of the internal register 223 for output to the controller 301 (S230).

Upon reception of the encrypted symmetric key E (KPb, Ks3), the controller 301 sends it to the cryptographic engine 303 (S232). When the cryptographic engine 303 receives the encrypted symmetric key E (KPb, Ks3), the first decryption unit 321 decrypts the encrypted symmetric key E (KPb, Ks3) using its own secret key Kpb to acquire the challenge key Ks3 (S236). Subsequently, the cryptographic engine 303 allows the random number generation unit 323 to create a session key Ks4 (S238) and the encryption unit 322 to encrypt the session key Ks4 using the challenge key Ks3, thereby generating an encrypted symmetric key E (Ks3, Ks4) for output to the controller 301 (S240). Upon reception of the encrypted symmetric key E (Ks3, Ks4)(S242), the controller 301 issues a session key input command (sequence ID=2) to the cryptographic engine 203 (S244). When the cryptographic engine 203 receives successfully the session key input command (S246), the controller 301 delivers the encrypted symmetric key E (Ks3, Ks4) to the cryptographic engine 203 (S248). When the cryptographic engine 203 receives the encrypted symmetric key E (Ks3, Ks4) (S250), the control unit 222 reads the challenge key Ks3 (sequence ID=2) on the region of sequence ID=2 of the internal register 223, then providing the received encrypted symmetric key E (Ks3, Ks4) and the challenge key Ks3 (sequence ID=2) to the second decryption unit 229. The second decryption unit 229 decrypts the encrypted symmetric key E (Ks3, Ks4) using the challenge key Ks3 (sequence ID=2) to acquire the session key Ks4 (S252), allowing the session key Ks4 (sequence ID=2) to be stored on the region of sequence ID=2 of the internal register 223 (S254).

Subsequently, the controller 301 issues a license data read command (sequence ID=2) to the cryptographic engine 203 to specify the read address of the license data (S256). Upon receiving successfully the license data read command (S258), the cryptographic engine 203 allows the control unit 222 to read the license data at the address specified in the confidential data storing unit 205 and temporarily store the license data in the region of sequence ID=2 of the internal register 223 (S260). Subsequently, the controller 301 issues a license data preparation command (sequence ID=2) to the cryptographic engine 203 (S262). When the cryptographic engine 203 receives successfully the license data preparation command (S264), the control unit 222 reads the license data and the session key Ks4 (sequence ID=2) on the region of sequence ID=2 of the internal register 223 for delivery to the second encryption unit 230. The second encryption unit 230 encrypts the license data using the session key Ks4 to create encrypted license data (S266), which is then temporarily stored on the region of sequence ID=2 of the internal register 223.

Subsequently, the controller 301 issues a license data output command (sequence ID=2) to the cryptographic engine 203 (S268). Upon receiving successfully the license data output command (S270), the cryptographic engine 203 delivers the encrypted license data to the controller 301 (S272). When the controller 301 acquires the encrypted license data (S274), a process for deallocating the sequence ID is performed between the controller 301 and the cryptographic engine 203 (S276). This process will be described in more detail with reference to FIG. 15. Subsequently, the controller 301 sends the encrypted license data to the cryptographic engine 303 (S278). When the cryptographic engine 303 receives the encrypted license data (S280), the second decryption unit 324 decrypts the encrypted license data using the session key Ks4 (S282). The resulting license data is sent to the content decryptor 304 to be used for the content decryptor 304 to decrypt the content. Through the aforementioned procedures, the license data for decrypting content is read by the reproducing device 300.

As described above, in this embodiment, cryptographic input/output processing for reading license data is divided into secure commands such as the certificate input command (S204), the challenge key preparation command (S218), the challenge key output command (S226), the session key input command (S224), the license data read command (S256), the license data preparation command (S262), and the license data output command (S268), thereby assigning the sequence ID to a series of cryptographic input/output processing. This makes it possible to identify to which process system a secure command belongs even when a plurality of cryptographic input/output processing are executed simultaneously. This allows for properly managing the sequence of the secure commands and securely managing keys or data exchanged using the secure commands for each process system.

Figure 12:
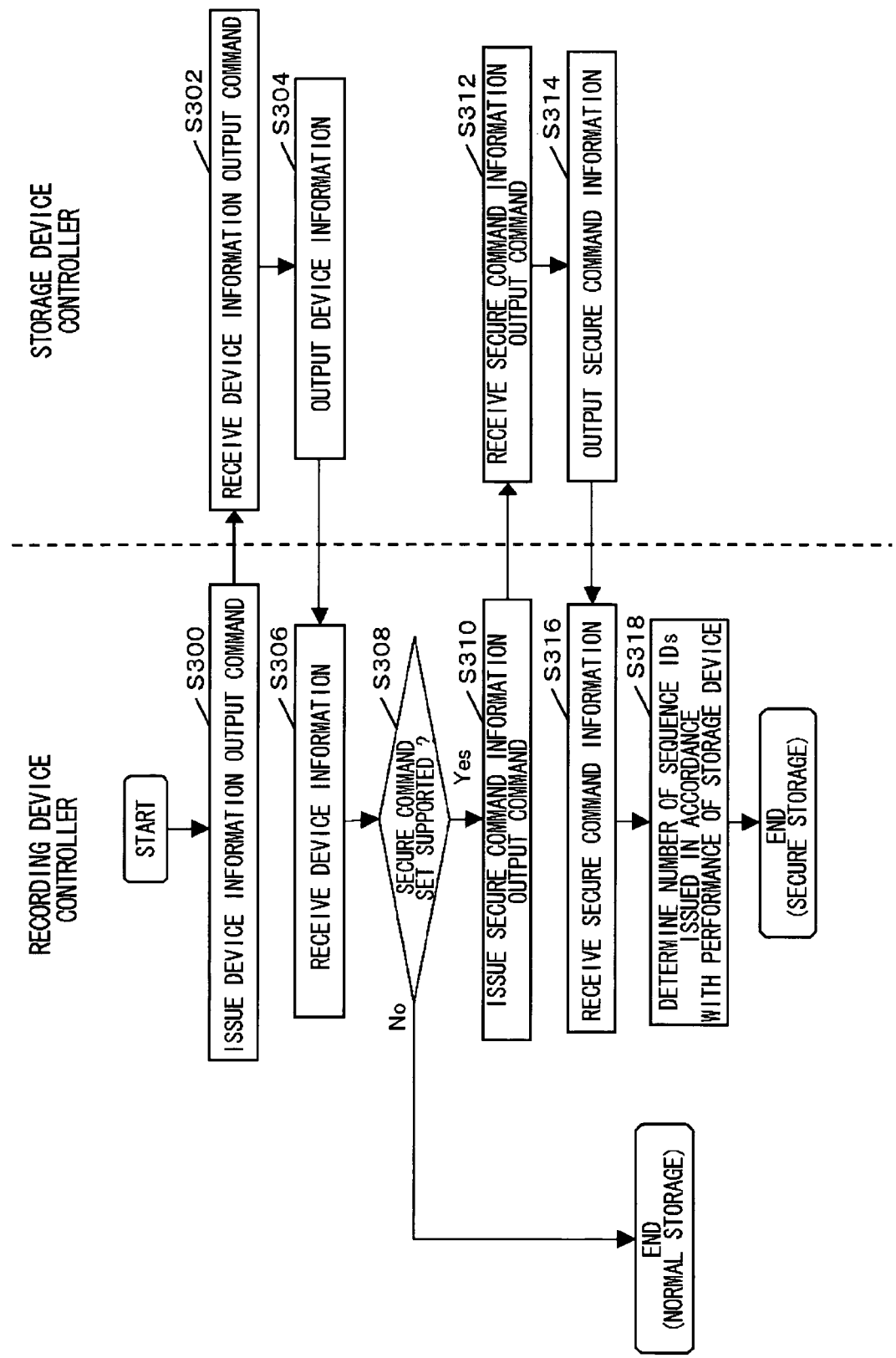
FIG. 12 is a diagram showing the procedure of determining the number of process systems that can be simultaneously performed between a host device and the storage device.

FIG. 12 shows the procedures for determining the number of process systems that can be performed simultaneously between a host device and a storage device. Connecting the storage device 200 to the recording device 100 will cause the controller 101 of the recording device 100 to issue a device information output command to the storage device (S300). Upon reception of the device information output command from the controller 101 of the recording device 100 (S302), the controller 201 of the storage device 200 outputs device information (S304). For example, the device information includes the type of hard disks, the capacity of storing normal data, interface conditions, and a support command set. Upon reception of the device information of the storage device 200 (S306), the controller 101 determines whether the storage device 200 supports the secure command set (S308). If not ("N" in S308), the storage device 200 is treated in the same manner as the conventional hard disk.

If the storage device 200 supports the secure command set ("Y" in S308), then the controller 101 issues a secure information output command (S310). Upon reception of the secure information output command (S312), the controller 201 outputs secure information (S314). For example, the secure information includes information regarding the cryptographic algorithm used for the secure command or a certificate or the time required for the execution of the secure command. The secure information also includes information on the maximum number of process systems capable of being simultaneously performed, i.e., on the sequence IDs available. Upon reception of the secure information of the storage device 200 (S316), the controller 101 uses the secure information to acquire information on the performance of the input and output of license data, such as the maximum number of process systems capable of being simultaneously performed in the storage device 200 or the time required for an encryption process in the storage device. Then, based on the acquired performance information and its own performance, the controller 101 determines the number of process systems to be employed in the recording device 100 (S318). The controller 101 writes license data within the determined range. The determined number of process systems may be informed to the storage device 200.

Figure 13:
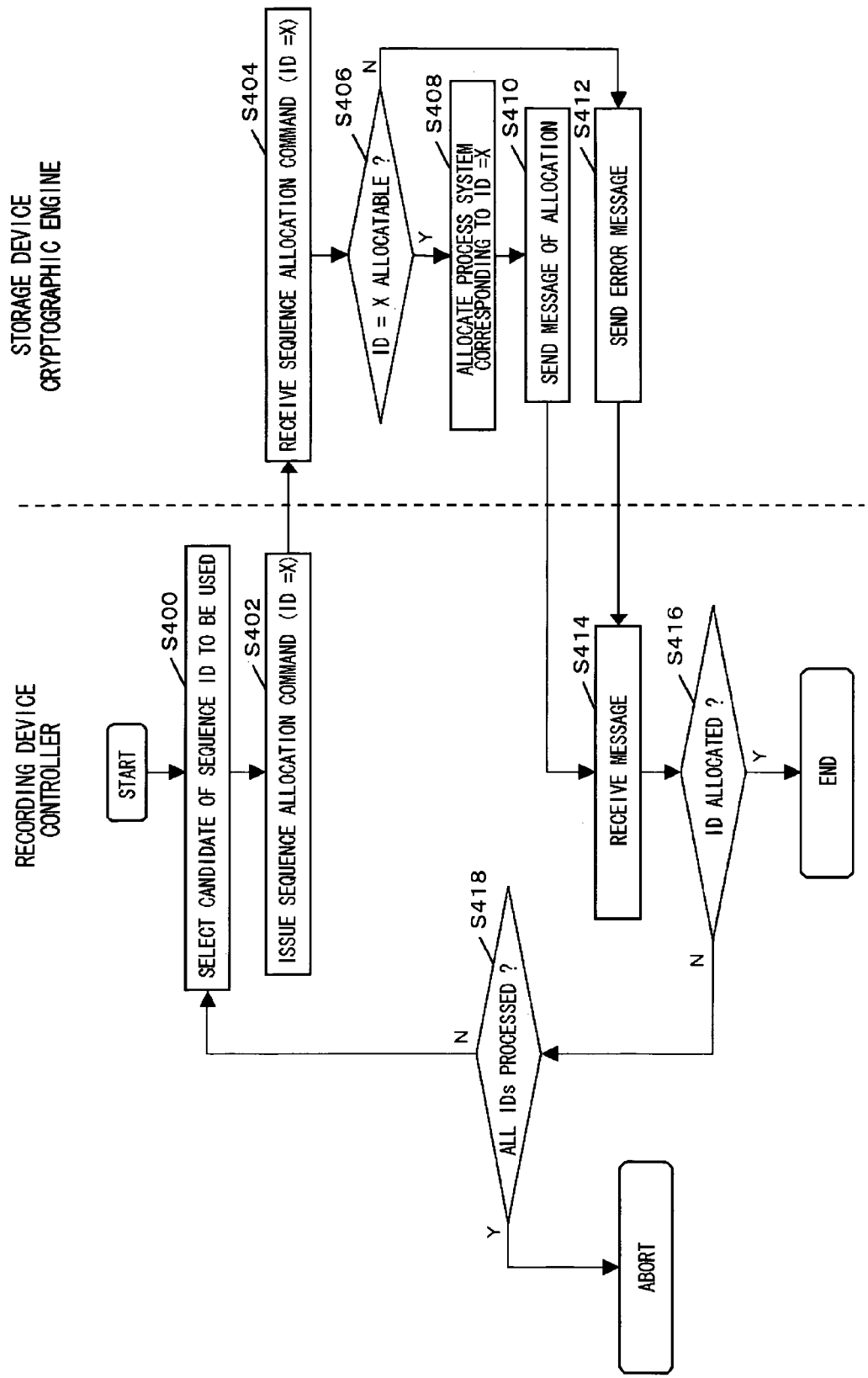
FIG. 13 is a diagram showing the procedure of allocating a sequence ID for identifying cryptographic input/output processing prior to the execution of the cryptographic input/output processing.

FIG. 13 shows the procedure for allocating a sequence ID to identify cryptographic input/output processing before the cryptographic input/output processing is performed, i.e., the procedure of the steps S100 and S200 of FIGS. 8 and 10, respectively. FIG. 13 shows an example of the process for acquiring information required to manage the sequence ID using the controller 101 of the recording device 100 or the controller 301 of the reproducing device 300. Referring to FIG. 13, the procedure for allocating a sequence ID between the recording device 100 and the storage device 200 will be explained; however, the same holds true for the allocation of a sequence ID between the reproducing device 300 ad the storage device 200.

First, the controller 101 selects an unused sequence ID from the candidates of available sequence IDs that have been acquired through the procedure of FIG. 12 (S400), and uses the sequence ID to issue a sequence allocation command to the storage device 200 (S402). Upon reception of the sequence allocation command (ID=x) from the recording device 100 (S406), the cryptographic engine 203 of the storage device 200 refers to the status register 221 to check the process status of the process system of the sequence ID, thereby determining whether the sequence ID can be allocated (S408). If the sequence ID=x is already being allocated (i.e., the status information is "Busy," "Normal," or "Error") or outside the range of available sequence IDs ("N" in S408), an error message is issued to the controller 101 (S412). If the sequence ID "x" is being deallocated (i.e., the status information is "Ready") ("Y" in S408), the cryptographic engine 203 is informed of a process system being allocated corresponding to the sequence ID in order to allocate the process system. The control unit 222 initializes the region associated with the sequence ID of the status register 221 to change the status information to "Normal" (S408). Then, the control unit 222 informs the controller 101 that the sequence ID has been allocated (S410). Upon reception of the message from the cryptographic engine 203 (S414), the controller 101 checks the content of the message (S416). If the message indicates that the sequence ID has been allocated ("Y" in S416), the step is terminated. If the message indicates an error ("N" in S416), it is determined whether all the available sequence IDs have been processed (S418). If the process has been completed ("Y" in S418), the process is terminated for the time being to wait for a sequence ID being deallocated. If not ("N" in S418), the step returns to S400 to issue a sequence allocation command using another sequence ID.

Figure 14:
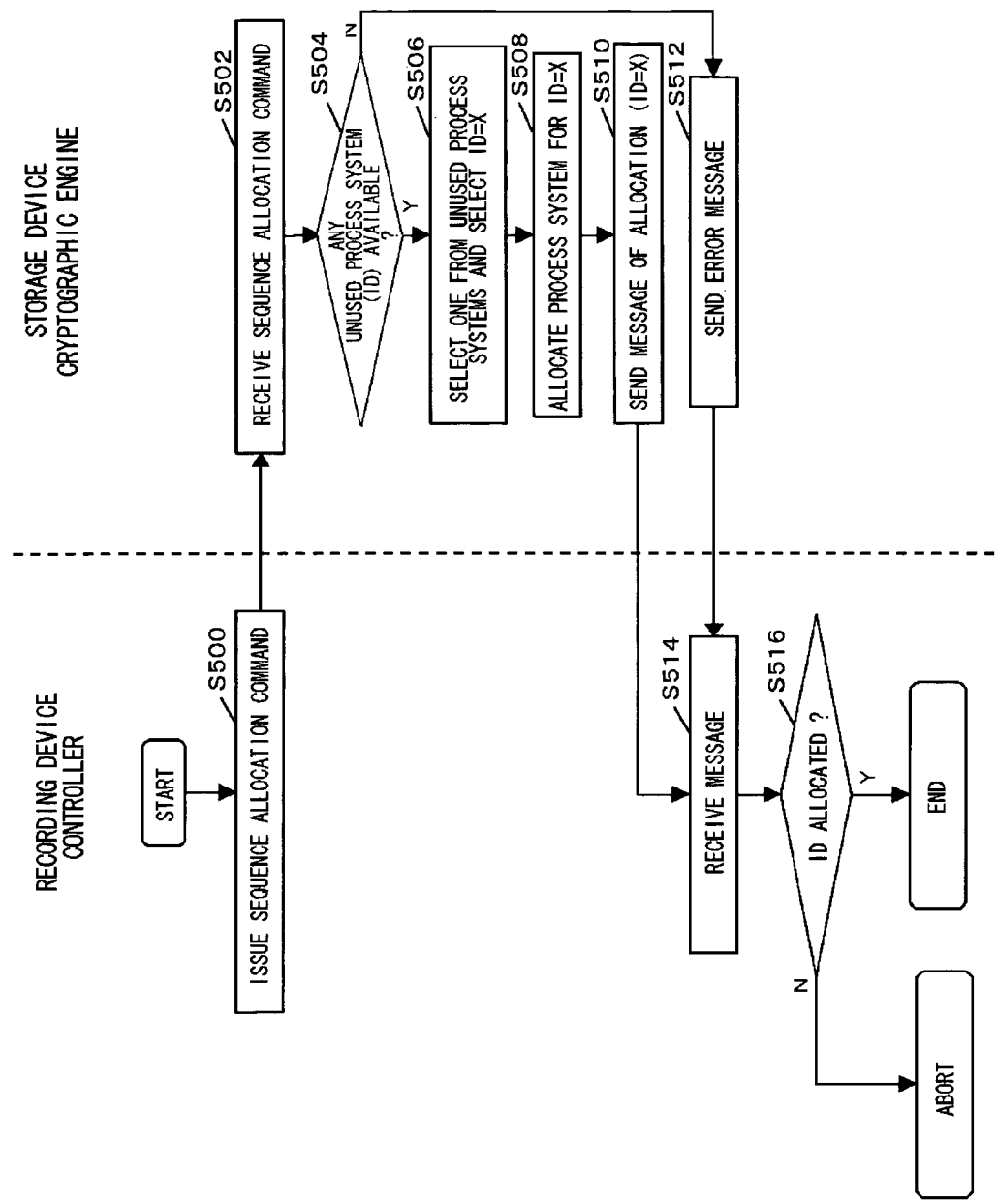
FIG. 14 is a diagram showing the procedure of allocating a sequence ID for identifying cryptographic input/output processing prior to the execution of the cryptographic input/output processing.

FIG. 14 shows another procedure for allocating a sequence ID to identify cryptographic input/output processing before the cryptographic input/output processing is performed. FIG. 14 shows an example of the cryptographic engine 203 of the storage device 200 determining a sequence ID employed. Referring to FIG. 14, the procedure for allocating a sequence ID between the recording device 100 and the storage device 200 will be also explained; however, the same holds true for the allocation of a sequence ID between the reproducing device 300 and the storage device 200.

First, the controller 101 issues a sequence allocation command to the storage device 200 (S500). Upon reception of the sequence allocation command from the recording device 100 (S502), the cryptographic engine 203 of the storage device 200 refers to the status register 221 to check for a sequence ID being deallocated (S504). If all the sequence IDs available are being allocated (i.e., the status information is "Busy," "Normal," or "Error") ("N" in S504), an error message is issued to the controller 101 (S512). If any sequence IDs are being deallocated (i.e., the status information is "Ready") and can be allocated ("Y" in S504), the step selects a sequence ID from among them (S506). In order to allocate the process system associated with the sequence ID, the control unit 222 initializes the region corresponding to the sequence ID of the status register 221 and changes the status information to "Normal" (S508). Then, the controller 101 is informed of the sequence ID allocated (S510). Upon reception of the message from the cryptographic engine 203 (S514), the controller 101 checks the content of the message (S516). If the message indicates that the sequence ID has been allocated ("Y" in S516), the step is terminated. If the message indicates an error ("N" in S516), the step is terminated for the time being to wait for a sequence ID being deallocated.

The two procedures of FIGS. 13 and 14 have been shown as an example of allocating a sequence ID; however, the storage device 200 does not necessarily conform to both the procedures. The storage device 200 may conform to either one or both of the procedures.

Figure 15:
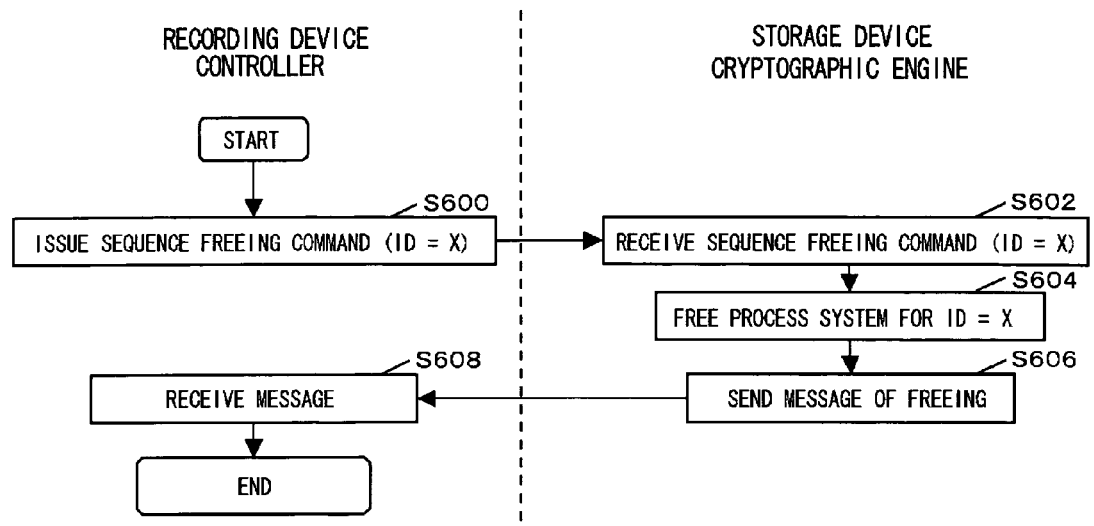
FIG. 15 is a diagram showing the procedure of deallocating a sequence ID.

FIG. 15 shows the procedure of deallocating a sequence ID. Referring to FIG. 15, a description is given to the procedure of the recording device 100 requiring the storage device 200 to deallocate a sequence ID; however, the same holds true for the reproducing device 300 requiring the storage device 200 to deallocate a sequence ID. Upon completing the execution of a series of cryptographic input/output processing, the controller 101 of the recording device 100 issues a sequence deallocation command for deallocating the sequence ID (S600). Upon reception of the sequence deallocation command (ID=x) from the recording device 100 (S602), the cryptographic engine 203 of the storage device 200 deallocates the process system associated with the sequence ID (S604), then changing the status information on the associated sequence ID of the status register 221 to "Ready." Thereafter, the cryptographic engine 203 informs the recording device 100 of the deallocation (S606). Upon reception of the message from the storage device 200 (S608), the controller 101 terminates the process.

Figure 16:
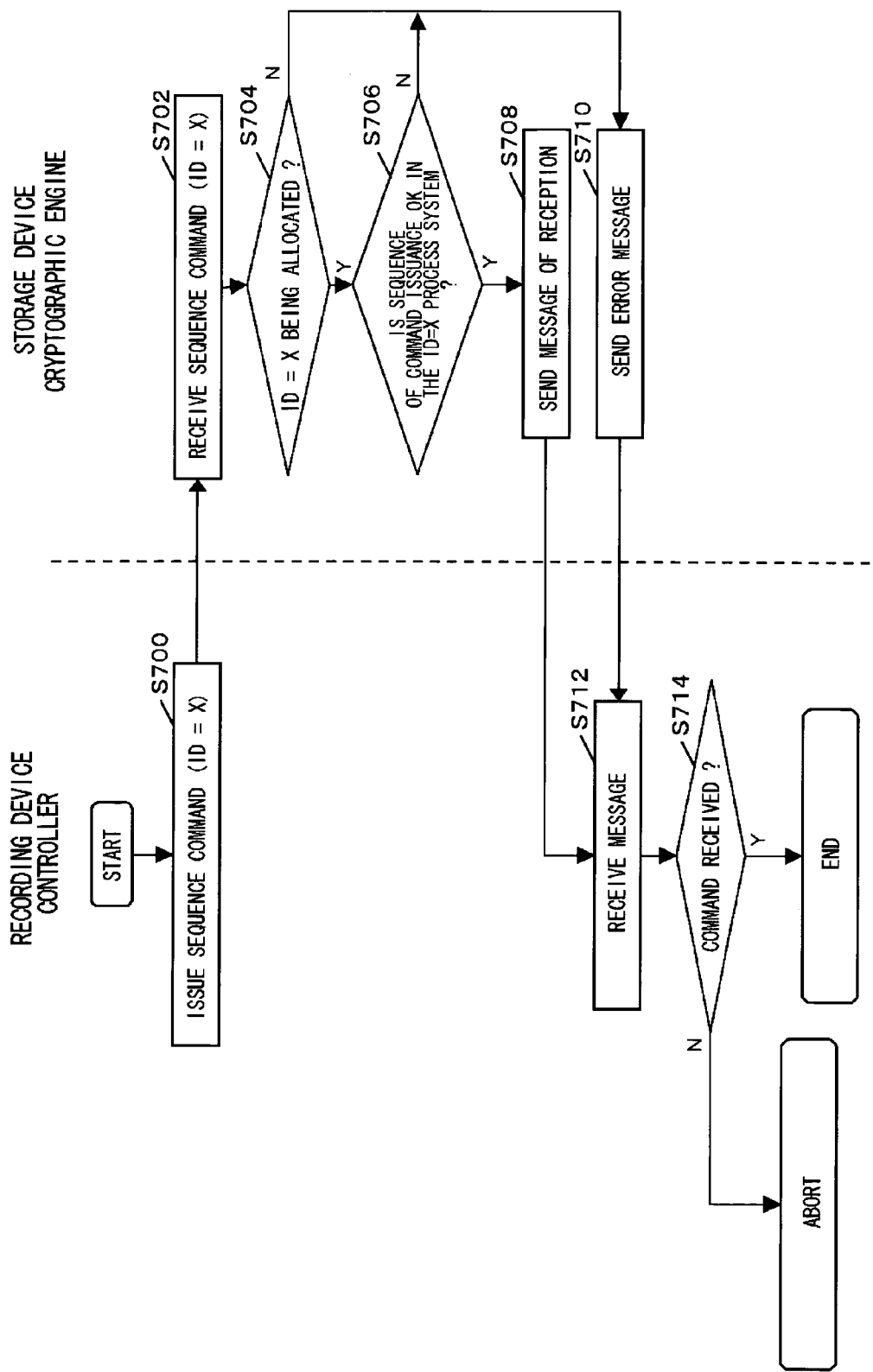
FIG. 16 is a diagram showing the procedure of allowing the cryptographic engine of the storage device to receive a secure command issued by the host device.

FIG. 16 shows the procedure of the cryptographic engine 203 receiving a secure command (hereinafter also referred to as a sequence command) issued by a host device. Referring to FIG. 16, a description is given to the procedure of the storage device 200 receiving a secure command issued by the recording device 100; however, the same holds true for the storage device 200 receiving a secure command issued by the reproducing device 300. First, the controller 101 of the recording device 100 issues a sequence command (ID=x) (S700). When the cryptographic engine 203 of the storage device 200 receives the sequence command (ID=x) from the recording device 100 (S702), the control unit 222 refers to the status information on the associated sequence ID of the status register 221 to check the status of the process system associated with the sequence ID, thereby determining whether the command can be executed (S704). If the status information indicates that the sequence ID is being deallocated or the preceding command is aborted or that the sequence ID is out of the range of available sequence IDs, it is determined that the command cannot be executed ("N" in S704), allowing an error message to be issued to the controller 101 (S710). However, some commands may be determined to be executable even when the preceding command is aborted. For example, those commands include the sequence deallocation command (S300 of FIG. 12 and S402 of FIG. 13), the certificate output command (S102 of FIG. 8), and the certificate input command (S208 of FIG. 10).

If it is determined that the status information of the sequence ID indicates that the command is executable ("Y" in S704), then the control unit 222 refers to the type of execution command of the sequence ID of the status register 221 to check whether the received sequence command has been issued in the correct order (S706). If the sequence command has been issued in an incorrect order ("Y" in S706), an error message is sent to the controller 101 (S710). If the sequence command has been issued in the correct order ("Y" in S708), the controller 101 is informed that the command is to be received (S708). Upon reception of the message (S712) from the storage device 200, the controller 101 checks the type of the message (S714). If the message indicates an acknowledgement ("Y" in S712), the controller 101 moves on to the subsequent process. If the message is an error message ("Y" in S712), the process is aborted.

On the other hand, when the storage device 200 has received the command to find that the status information on the process system associated with the sequence ID is "Normal" or has changed from "Busy" to "Normal", the control unit 222 changes the status information on the process system associated with the sequence ID to "Busy" and the type of the execution command to the number of the associated command, then initiating the process. If the status information has changed from "Busy" to "Error," the received command is not executed. Then, upon reception of the subsequent sequence command of the process system associated with the sequence ID, the procedure of FIG. 16 will confirm again that the command for the sequence ID has been aborted, allowing an error message to be issued in S710.

Upon reception of an incorrect sequence command, the cryptographic engine 203 may forcefully terminate the process of its process system. That is, the region associated with the sequence ID of the status register 221 may be initialized. This makes it possible to reduce the risk of the process being continued for an incorrect command, thereby providing an improved tamper resistance. Suppose that some error has occurred in a sequence command. In this case, to execute its cryptographic input/output processing again, the recording device 100 needs to start over with the first sequence command. In another example, a log of communications can be kept to refer to the communications log thus kept to verify that authorized sequence commands have been executed. In this case, the process may be started from the subsequent sequence command.

Figure 17:
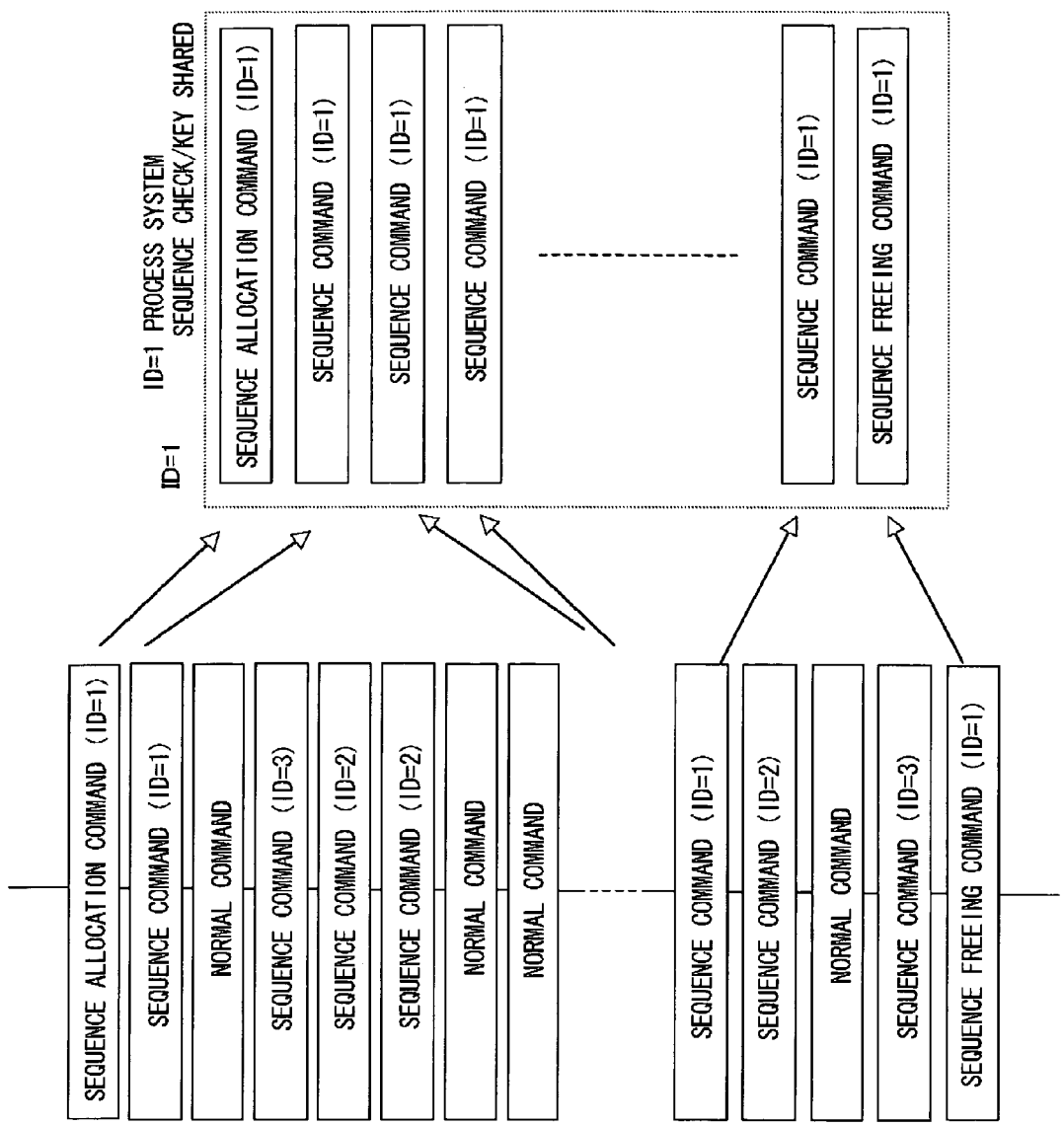
FIG. 17 is a diagram showing how the host device issues a command to the storage device.

FIG. 17 shows how a host device issues a command to the storage device 200. The example shown in FIG. 17 provides three process systems for the cryptographic input/output processing between the host device and the storage device 200. The host device issues simultaneously sequence commands that are identified by the sequence ID=1, 2, and 3, and an ordinary command to the storage device 200. The storage device 200 sequentially process the received commands. However, as illustrated, each process system identifies the sequence command using the sequence ID while checking appropriately the sequence of the commands to put forward with the process.

The aforementioned descriptions are based on the assumption that all the process systems managed with the sequence ID perform license data input and output operations in accordance with the methods described above. However, individual process systems each assigned a sequence ID may be adapted to perform a license data input and output operation in accordance with a separate process system. To this end, a host device is adapted to specify a process system for performing the license data input and output operation upon allocation of a sequence ID. Hereinafter, the process system designated here is referred to as the process mode. After a sequence ID has been assigned a process system, the storage device 200 determines whether a received command belongs to the specified process system and has bee issued in the correct order. If either one of these conditions is not satisfied, the storage device 200 returns an error as a response to the received command or interrupts the process system.

Second Embodiment

Figure 18:
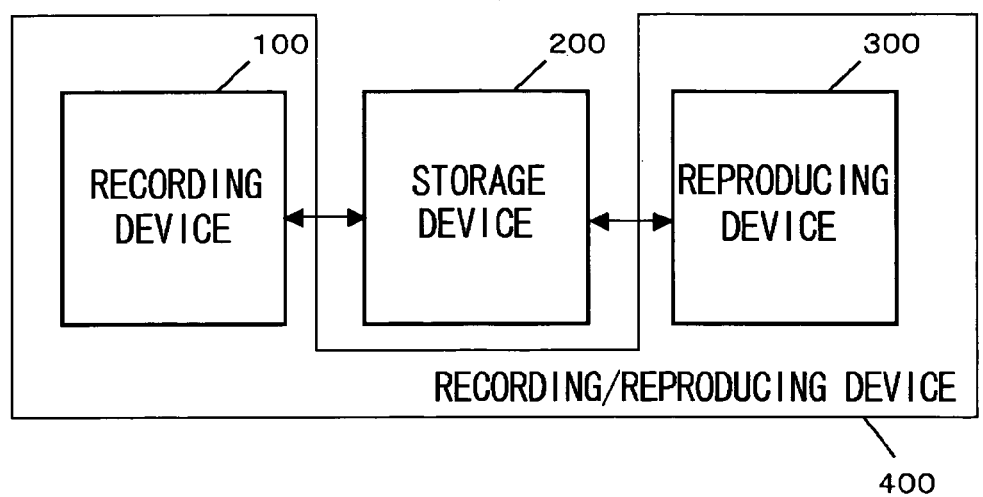
FIG. 18 is a diagram showing the entire configuration of a data management system according to a second embodiment.

FIG. 18 illustrates the entire configuration of a data management system 10 according to a second embodiment. In this embodiment, the recording device 100 and the reproducing device 300 of the first embodiment are integrated into one recording/reproducing device 400.

Figure 19:
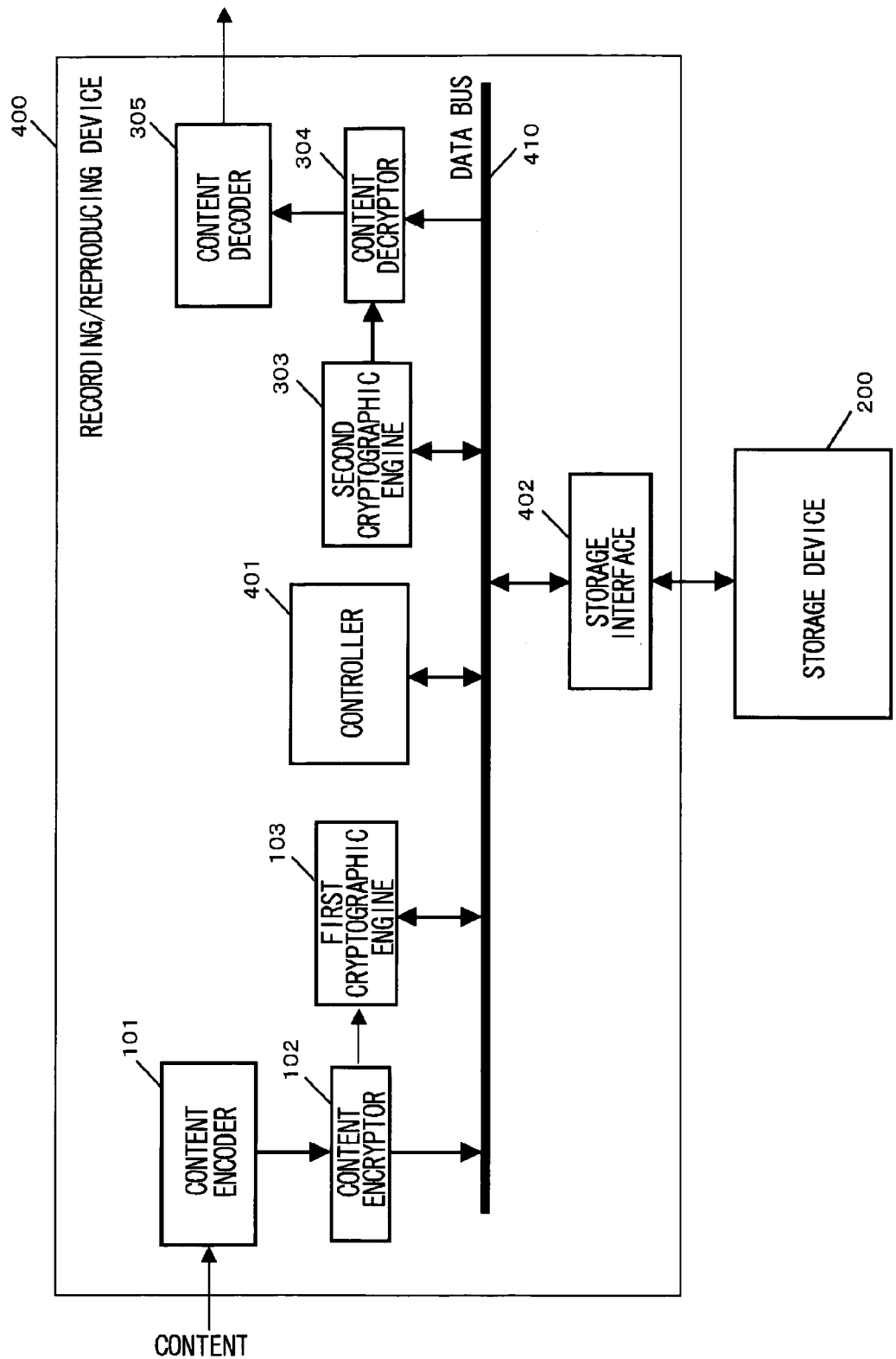
FIG. 19 is a diagram showing the internal configuration of a recording/reproducing device according to the second embodiment.

FIG. 19 illustrates the internal configuration of the recording/reproducing device 400 according to this embodiment. The recording/reproducing device 400 includes the arrangements of the recording device 100 of the first embodiment shown in FIG. 2 and the reproducing device 300 of the first embodiment shown in FIG. 3, in which the like symbols denote the like components. The first cryptographic engine 103 corresponds to the cryptographic engine 103 of the recording device 100 of the first embodiment, while the second cryptographic engine 303 corresponds to the cryptographic engine 303 of the reproducing device 300 of the first embodiment. The internal configuration of the first cryptographic engine 103 is the same as that of the cryptographic engine 103 of the first embodiment shown in FIG. 5, while the internal configuration of the second cryptographic engine 303 is the same as the cryptographic engine 303 of the first embodiment shown in FIG. 6. A controller 401 has the functions of both the controller 101 of the recording device 100 and the controller 301 of the reproducing device 300 according to the first embodiment. A storage interface 402 controls the exchange of data with the storage device 200, and a data bus 410 electrically connects between the components of the recording/reproducing device 400.

This embodiment allows the recording/reproducing device 400 to operate in the same manner as the first embodiment by replacing the data management system 10 of the first embodiment with the recording/reproducing device 400, the cryptographic engine 103 with the first cryptographic engine 103, the controller 101 with the controller 401, the reproducing device 300 with the recording/reproducing device 400, the cryptographic engine 303 with the second cryptographic engine 303, and the controller 301 with the controller 401, respectively.

Figure 20:
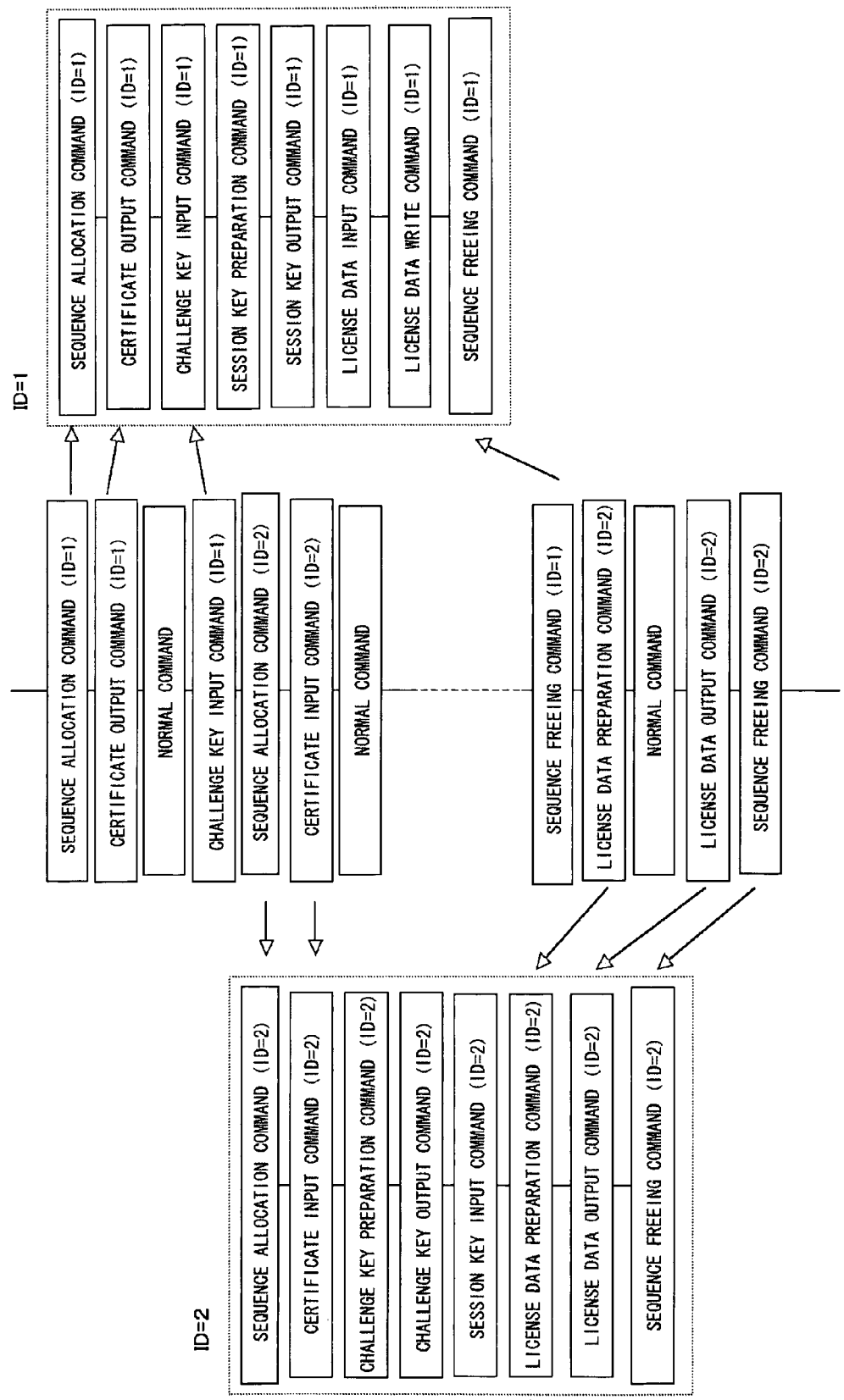
FIG. 20 is a diagram showing how the recording/reproducing device issues a command to a storage device.

FIG. 20 shows how the recording/reproducing device 400 issues a command to the storage device 200. In FIG. 20, the procedures of writing and reading the license data shown in FIGS. 8 to 11 are executed concurrently. The storage device 200 identifies various commands issued sequentially using

Third Embodiment

Figure 21:
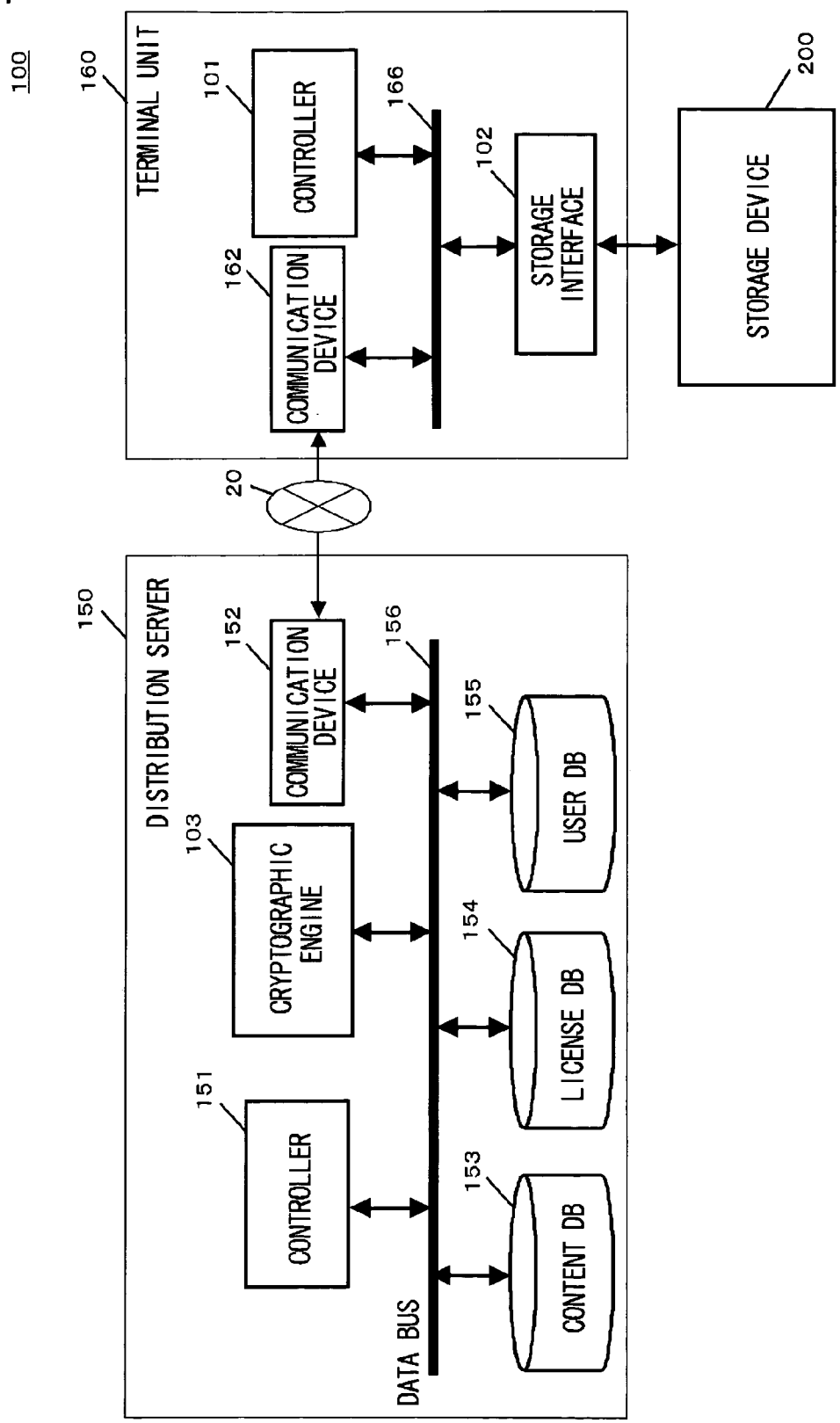
FIG. 21 is a diagram showing the internal configuration of a recording device according to a third embodiment.

FIG. 21 shows the internal configuration of a recording device 100 according to third embodiment. This embodiment realizes the recording device 100 of the first embodiment as a distribution server 150 for distributing contents and a terminal device 160 for receiving contents. The distribution server 150 includes a cryptographic engine 103, a communications device 152, a content database 153, a license database 154, a user database 155, and a controller 151 for providing control to these components, and a data bus 156 for electrically connecting these components. The terminal device 160 includes a controller 101, a storage interface 102, a communications device 162, and data bus 166 for electrically connecting these components. The distribution server 150 and the terminal device 160 are connected to each other via the communications devices 152 and 162, respectively, over the Internet 20, an example of a network. The cryptographic engine 103 of the distribution server 150 has the same function as that of the cryptographic engine 103 of first embodiment. The controller 101 and the storage interface 102 of the terminal device 160 have the same functions as those of the controller 101 and the storage interface 102 of the first embodiment, respectively.

The content database 153 retains content that is provided to users. The license database 154 retains license data containing content keys for use with encryption of content. In this embodiment, content has already been encrypted using content keys and stored in the content database 153. However, content data that has not yet been encrypted may be stored in the content database 153, and the content encoder 105 and the content encryptor 104 according to the first embodiment may be further provided in the distribution server 150, such that the content is read out of the content database 153 to be encoded for encryption. The user database 155 holds information on users who are provided with the content. For example, the user database 155 may retain information such as user private information, the address of the terminal device 160, the purchase history of contents, and billing data. The controller 151 reads encrypted content out of the content database 153 for provision to a user in response to the request of the user. When the license data for decrypting the content by the cryptographic engine 103 is provided to the user, the controller 151 updates the user database 155 to charge the user for the cost of the content.

The procedure of the cryptographic input/output processing according to this embodiment is the same as that of the first embodiment. Since communications between the cryptographic engine 103 and the controller 101 are provided via the Internet 20, this embodiment may have an increased risk of data being leaked out when compared with the first embodiment in which communications are provided within the same system. However, as described with reference to FIGS. 8 to 11, data is always encrypted for transmission and reception between the cryptographic engine 103 and the controller 101, thereby providing a high tamper resistance.

Figure 22:
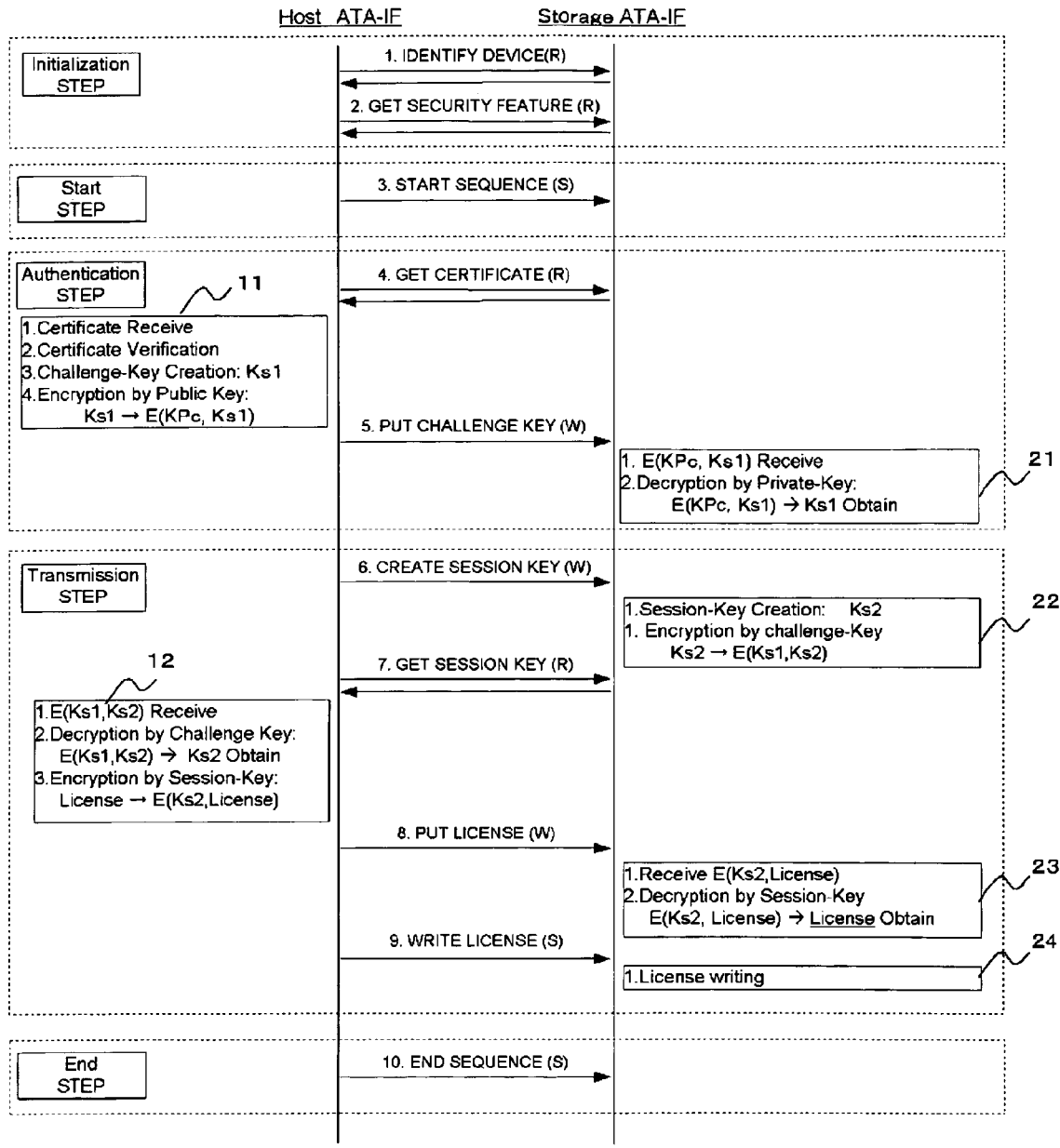
FIG. 22 is a diagram showing a sequence performed until the recording device according to the first embodiment writes license data in the storage device.

FIG. 22 is a sequence diagram illustrating a series of procedures on an ATA interface carried out until license data is stored in the storage device 200 after power has been turned on. This is an example in which a series of processes are successfully performed from the initial procedure of FIG. 12 through the allocation of a sequence ID of FIG. 13 and the procedure of writing license data in the storage device 200 of FIGS. 8 and 9 to the deallocate of the sequence ID in FIG. 14.

A "Host ATA-IF" corresponds to the storage interface 102 of the recording device 100, while "Storage ATA-IF" corresponds to the storage interface 202 of the storage device 200. In the center portion sandwiched between the two ATA-IFs, shown are secure commands. The (W), (R), and (S), which are written after each command name, show the property of the command. The (W) indicates that data stream needs to be entered, i.e., that the storage device 200 requires data after the command has been received. In contrast to the (W), the (R) indicates that output of data stream is followed, while the (S) indicates a command that follows no input or output of data stream.

The commands "IDENTIFY DEVICE," "GET SECURITY FEATURE," "START SEQUENCE," "GET CERTIFICATE," "PUT CHALLENGE KEY," "CREATE SESSION KEY," "GET SESSION KEY," "PUT LICENSE," "WRITE LICENSE," and "END SEQUENCE" correspond to the device information output command, the secure information output command, the sequence allocation command, the certificate output command, the challenge key input command, the session key preparation command, the challenge key output command, the license data input command, the license data write command, and the sequence deallocation command, respectively.

The sequence is divided into the "Initialization STEP (an initial procedure)" for acquiring information on the storage device 200, the "Start_STEP" for allocating a sequence ID, the "Authentication_STEP" performed to verify the content of the storage device 200 until the challenge key Ks1 is shared, the "Transmission_STEP" performed until license data is transferred and written, and "End STEP" for deallocating the sequence ID. To subsequently store the license data in the storage device 200 after the "WRITE LICENSE(license data write command)" has been executed, the "Transmission_STEP" may be repeated. In this case, security will not be spoiled. Alternatively, the process can be started from the "Authentication_STEP."

The present invention has been described in accordance with the embodiments. Those skilled in the art will understand that these embodiments are only illustrative, various modifications can be therefore made to the combinations of each of the components or each of process steps, and those modifications fall within the scope of the present invention.

In the embodiments, the functional blocks for performing encryption and decryption in each cryptographic engine are shown separately, whereas these components may share some of the circuitry. This can suppress the hardware scale, contributing to miniaturization and a reduction in power consumption.

Although the present invention has been described by way of exemplary embodiments, it should be understood that many changes and substitutions may further be made by those skilled in the art without departing from the scope of the present invention which is defined by the appended claims.

What is claimed is:

1. A storage device comprising:
   an ordinary data storage unit which stores encrypted contents data;
   a secret data storage unit which stores license data containing a contents key for decrypting the encrypted contents data;
   a cryptographic processing unit which receives, from a host device, and executes a command corresponding to each of a plurality of sequenced subprocesses produced by dividing each of a series of cryptographic input and output processes for encrypting data to be secured and inputting and outputting the data between the storage device and the host device;

a controller which inputs and outputs the license data via the cryptographic processing unit and inputs and outputs the encrypted contents data bypassing the cryptographic processing unit; and a bus for receiving the command from the host device, the bus being deallocated for another command when the command is issued, wherein the cryptographic processing unit receives commands corresponding to a plurality of subprocesses respectively belonging to two or more different cryptographic input and output processes via the bus, refers to identifying information attached to the command, identifies to which cryptographic input and output process the command belongs, manages the sequence of commands executed in each cryptographic input and output process, and rejects the execution of an incorrectly sequenced command when the cryptographic processing unit receives the incorrectly sequenced command.

2. The storage device according to claim 1, wherein when the cryptographic processing unit receives the incorrectly sequenced command, the cryptographic processing unit interrupts the cryptographic input and output process to which the command belongs.

3. The storage device according to claim 1, wherein the number of the cryptographic input and output processes which can be performed simultaneously by the storage device is predetermined in accordance with a performance of the storage device.

4. The storage device according to claim 1, wherein in response to a request from the host device, the storage device provides to the host device the maximum number of cryptographic input and output processes which can be performed simultaneously by the storage device.

5. The storage device according to claim 1, wherein the storage medium comprises a normal data storing unit and a confidential data storing unit, the normal data storing unit storing normal data to be exchanged bypassing the cryptographic processing unit, the confidential data storing unit storing the secret data to be exchanged via the cryptographic processing unit.

6. A storage device comprising:

an ordinary data storage unit which stores encrypted contents data;

a secret data storage unit which stores license data containing a contents key for decrypting the encrypted contents data;

a cryptographic processing unit for receiving, from a host device, and executing a command corresponding to each of the plurality of sequenced subprocesses produced by dividing each of a series of cryptographic input and output processes for encrypting data to be secured and inputting and outputting the data between the storage device and the host device;

a controller which inputs and outputs the license data via the cryptographic processing unit and inputs and outputs the encrypted contents data bypassing the cryptographic processing unit; and a bus for receiving the command from the host device, the bus being deallocated for another command when the command is issued, wherein the cryptographic processing unit receives commands corresponding to a plurality of subprocesses respectively belonging to two or more different cryptographic input and output processes via the bus, refers to identifying information attached to the command, identifies to which cryptographic input and output process the received command belongs to, and rejects the execution of the command when having detected that the command is an incorrectly sequenced command in the cryptographic input and output process to which the command belongs.

7. The storage device according to claim 6, wherein in response to a request from the host device, the storage device provides to the host device the maximum number of cryptographic input and output processes which can be performed simultaneously by the storage device.

8. A host device which exchanges encrypted contents data and license data containing a contents key for decrypting the encrypted contents data, with a storage device that is capable of simultaneously performing a plurality of series of cryptographic input and output processes for encrypting data to be secured and inputting and outputting the data, the host device comprising:

a controller which divides the cryptographic input and output process into a plurality of sequenced subprocesses and issues commands sequentially to the storage device thereby allowing the storage device to execute a subprocess to be executed on the storage-device side; and a cryptographic processing unit which carries out encryption or decryption that is required of the cryptographic input and output process, wherein the controller inputs and outputs the license data via the cryptographic processing unit and inputs and outputs the encrypted contents data bypassing the cryptographic processing unit, and when the controller issues a command, the controller attaches identifying information to the command to identify to which one of the plurality of cryptographic input and output processes the command belongs and to manage the sequence of commands executed in each cryptographic input and output process, and the controller that issues the command via the bus electrically connecting the host device and the storage device deallocates the bus for another command.

9. The host device according to claim 8, wherein the controller issues a command to allocate a process system for performing the cryptographic input and output process prior to initiation of the cryptographic input and output process.

10. A data input and output method for exchanging encrypted contents data and license data containing a contents key for decrypting the encrypted contents data between a storage device and a host device, wherein, when performing a cryptographic input and output process between the host device and the storage device, which is capable of simultaneously performing a plurality of series of cryptographic input and output processes for encrypting data to be secured and inputting and outputting the data, the license data is input and output through the cryptographic input and output process, and the encrypted data is input and output bypassing the cryptographic input and output process, the method comprising:

dividing the cryptographic input and output process into a plurality of procedures and allowing the host device to execute a procedure to be executed on the host-device side out of the procedures;

allowing the host device to issue a command to the storage device via a bus for electrically connecting the host device and the storage device in order to make the storage device execute a procedure to be executed on the storage-device side;

allowing the host device to deallocate the bus for another command;

allowing the storage device to receive the command; and allowing the storage device to execute the command, wherein identifying information is attached to the command to identify to which one of the plurality of cryptographic input and output processes, being performed simultaneously by the storage device, the command belongs, and the allowing the storage device to receive the command includes:

determining whether the received command is a correctly sequenced command in the cryptographic input and output process;

accepting the command successfully when the received command has been determined to be a correctly sequenced command; and rejecting the execution of the received command when the received command has been determined to be an incorrectly sequenced command.

11. The data input and output method according to claim 10, further comprising predetermining an upper-limit number of the cryptographic input and output processes that can be performed simultaneously by the storage device in accordance with performance of the storage device.

12. The data input/output method according to claim 10, further comprising:

allowing the storage device to predetermine an upper-limit number of the cryptographic input and output processes that the storage device can perform simultaneously in accordance with its own performance, and informing the host device of the upper limit.

13. The data input and output method according to claim 11, further comprising, prior to performing the cryptographic input and output processes, selecting and allocating identifying information for identifying the cryptographic input and output process to be performed from among the prepared number of pieces of identifying information determined in the determining step.

14. The data input and output method according to claim 12, further comprising, prior to performing the cryptographic input and output processes, selecting and allocating identifying information for identifying the cryptographic input and output process to be performed from among the prepared number of pieces of identifying information determined in the determining step.

15. The data input and output method according to claim 10, wherein when the received command has been determined to be an incorrectly sequenced command, the execution of the cryptographic input and output process to which the command belongs is interrupted.

* * * * *